(12) United States Patent
Tsai

(10) Patent No.: US 6,231,347 B1
(45) Date of Patent: May 15, 2001

(54) COMPUTER SYSTEM AND KARAOKE SYSTEM

(75) Inventor: Tom Jen Tsai, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 08/753,066

(22) Filed: Nov. 19, 1996

(30) Foreign Application Priority Data

| Nov. 20, 1995 | (JP) | 7-301768 |
| Nov. 20, 1995 | (JP) | 7-301769 |
| Nov. 20, 1995 | (JP) | 7-301770 |
| Nov. 20, 1995 | (JP) | 7-301771 |
| Nov. 20, 1995 | (JP) | 7-301772 |
| Nov. 20, 1995 | (JP) | 7-301773 |

(51) Int. Cl.⁷ .............. G10H 1/36; G09B 5/00; A63H 5/00
(52) U.S. Cl. ............ 434/307 A; 434/307 R; 84/609; 348/461; 348/552
(58) Field of Search ........ 434/118, 307 R–309, 434/318, 365; 84/477 R, 601, 603, 608–610, 625, 630, 631, 645; 369/2, 30, 48, 178, 192; 360/32, 33.01, 49, 70, 77.01; 348/6, 7, 12, 13, 478, 461, 571, 688, 569, 552; 380/3; 381/51; 463/24, 25, 29, 40–42; 340/825.35

(56) References Cited

U.S. PATENT DOCUMENTS

| 4,926,737 | * | 5/1990 | Minamitaka | 84/611 |
| 5,131,311 | * | 7/1992 | Murakami et al. | 434/307 A |
| 5,247,126 | * | 9/1993 | Okamura et al. | 434/307 A |
| 5,369,217 | * | 11/1994 | Yamashita et al. | 84/611 |
| 5,465,240 | * | 11/1995 | Mankovitz | 369/1 |
| 5,481,509 | * | 1/1996 | Knowles | 369/30 |
| 5,489,103 | * | 2/1996 | Okamoto | 463/29 |
| 5,494,443 | * | 2/1996 | Nakai et al. | 434/307 A |
| 5,532,923 | * | 7/1996 | Sone | 364/138 |
| 5,570,340 | * | 10/1996 | Lee et al. | 369/275.3 |
| 5,592,609 | * | 1/1997 | Suzuki et al. | 395/173 |
| 5,596,373 | * | 1/1997 | White et al. | 348/569 |
| 5,599,231 | * | 2/1997 | Hibino et al. | 463/29 |
| 5,609,486 | * | 3/1997 | Miyashita et al. | 84/477 R X |
| 5,634,848 | * | 6/1997 | Tsuda et al. | 463/25 |
| 5,683,253 | * | 11/1997 | Park et al. | 434/307 A |
| 5,691,494 | * | 11/1997 | Sai et al. | 434/307 A X |
| 5,735,744 | * | 4/1998 | Okamoto | 434/307 A X |
| 5,797,752 | * | 8/1998 | Umezawa | 434/307 A |
| 5,808,224 | * | 9/1998 | Kato | 84/609 |
| 5,812,937 | * | 9/1998 | Takahisa et al. | 455/66 |
| 5,890,910 | * | 4/1999 | Tsurumi et al. | 434/307 A |

FOREIGN PATENT DOCUMENTS

| 465246 | | 1/1992 | (EP) . | |
| 509766 | | 10/1992 | (EP) . | |
| 626689 | | 11/1994 | (EP) . | |
| 6-67682 | * | 3/1994 | (JP) | 434/307 A |
| 6-318090 | * | 11/1994 | (JP) | 434/307 A |
| 8-194453 | * | 7/1996 | (JP) | 434/307 A |
| 8-234781 | * | 9/1996 | (JP) | 434/307 A |
| 8-272341 | * | 10/1996 | (JP) | 434/307 A |

\* cited by examiner

*Primary Examiner*—Joe H. Cheng
(74) *Attorney, Agent, or Firm*—Pillsbury Winthrop LLP

(57) ABSTRACT

A computer system includes storage device for storing a plurality of object files, each file including a program and information on the genre of music, and said computur system selecting an object file from the storage device and executing a program stored in the selected object file.

28 Claims, 19 Drawing Sheets

FIG. 5

PAGE obj (DRAW)

NEW
    DRAWING = PICTURE (#1) obj ······ a
                  TEXT (#1) obj ······ b
                  TEXT (#3) obj ······ c DELAY (5s)
    BGM = MUSIC (#1) obj

SELECTOR (DEFINES BUTTONS)
    BUTTON ID#1
    BUTTON ID#2

§ BUTTON ID#1 ○
    • POINT (OPERATIONS CARRIED OUT WHEN IT IS MARKED)
        DISPLAY OF ARROWY INDICATION, MUSIC (#n) obj, ······

• UNMARKED STATE (OPERATIONS CARRIED OUT WHEN IT IS NOT MARKED)
        ERASURE OF ARROWY DIRECTION, ······
    • SELECTED STATE (OPERATIONS CARRIED OUT WHEN IT IS SELECTED)
        EXECUTION, ······

FIG. 6

```
MUSIC obj

PLAY = CD (CONTROL OF EXTERNAL EQUIPMENT)

PLAY = #1 KARAOKE DATA (RESOURCE)
       ⋮

END (WHEN WILL BE CARRIED OUT AFTER COMPLETION OF
          KARAOKE PERFORMANCE)

TO ANOTHER obj (ex. REPETITIVE PERFORMANCE OF
                       CURRENT MUSIC BY CALLING
                       CURRENT OBJECT)
```

FIG. 7

```
PICTURE obj

FILE = #1 PICTURE RESOURCE

COORDINATES OF DRAW = (x, y)
```

FIG. 8

```
TEXT obj

STRING = " A B C D E F "

COORDINATES OF DRAW = (x, y)
```

FIG. 25
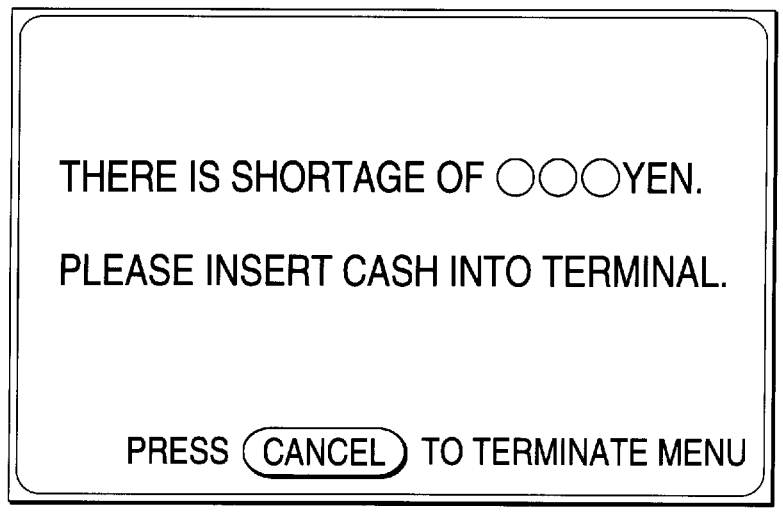
FIG. 26
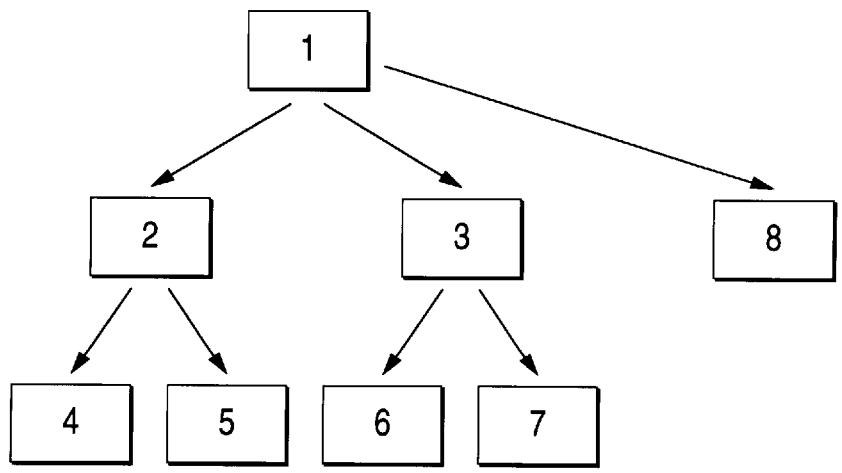
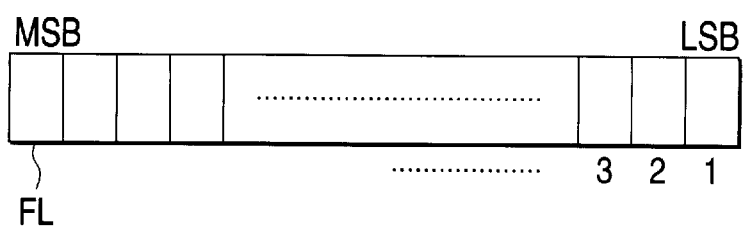

COMPUTER SYSTEM AND KARAOKE SYSTEM

BACKGROUND OF THE INVENTION

1. Field of the Invention

The present invention relates to a computer system capable of automatically creating a list of a plurality of object files to be executed and a karaoke system comprising the computer system.

2. Related Art

As is publicly known, a communication karaoke system has achieved widespread. The system delivers music information for karaoke purposes to karaoke terminals disposed in bars, such as karaoke bars, from a host computer installed in the center station over a communications line. In particular, a recently known karaoke system offers users newly released music and a variety of information items in the form of commercial messages run in between karaoke performances.

Further, another type of karaoke system is conceived which offers users information services, such as games and tour information, as well as commercial messages.

In the karaoke industry, the rendering of a variety of information services such as games and guidance to the user is briskly planned. This type of information service can be also applied to a common computer system, like the one in the communication karaoke system.

With the increasing number of types of information services to be offered through the karaoke system, a menu of available services becomes necessary. In many cases, however, commercial messages and information services to be offered may differ from karaoke bar to karaoke bar. For this reason, one is required to prepare an individual menu for each karaoke bar, which results in laborious work. It is desirable to change the contents of commercial messages and information services corresponding to seasons and time periods in order to respond to customer needs. However, it becomes necessary to modify the menu each time the commercial messages and information services are changed.

Specifically, it is preferable to provide a service in view of an individual status, such as age, sex, favorite while using the karaoke. However, in this case, it is necessary to prepare the menu depending on each individual. Thus, it becomes difficult to achieve this purpose.

A conventional computer system and a karaoke system using the computer system have failed to grasp what kind of information service is accessed, which in turn makes it impossible to know customer needs and market trends.

Some of information services are pay services, and therefore it becomes necessary to charge for the information services. However, a conventional karaoke system is not designed so as to sufficiently cope with accounting operations. For this reason, the conventional karaoke system has encountered problems when offering pay information services.

When a variety of information services such as commercial messages are offered, the services are generally offered in the form of a file that has descriptions of controls related to the display of contents or key operations. This file is read and executed by a CPU of a karaoke terminal, whereby predetermined information services are offered. Such information services can be offered through a common computer system as through the karaoke system.

However, a file used in conventional information services comprises program portions and data portions in an inseparable manner. For example, even in the case of a file using the same data (e.g., image or musical sound data), the system has such a structure that each file individually holds data.

With the increasing number of information service to be offered through the karaoke system, there arises the issue of how to access a desired service from a normal karaoke performance mode.

Specifically, provided that complicated operations or much time is required to access a service, the service may not be used even if many services are prepared.

It was impossible for the conventional karaoke system to accept a karaoke request while the information service is being offered. If this becomes possible, it will be very convenient for the user.

The present invention has been conceived in view of the above-described drawbacks in the related art background, and the primary object of the present invention is to provide a karaoke system capable of quickly offering a desired service with simple operations. Another object of the present invention is to provide a karaoke terminal capable of easily accepting a karaoke request while an information service is offered. Such a problem arises in a computer system which offers a variety of information services as well as the karaoke system.

SUMMARY OF THE INVENTION

The present invention has been conceived in view of the above-described drawback in the related background art, and the primary object of the present invention is to provide a computer system capable of automatically generating a menu corresponding to changes in information services to be offered, and a karaoke system employing that computer system.

Another object of the present invention is to provide a computer system capable of automatically generating a menu according to the individual status of the user.

Another object of the present invention is to provide a computer system and a karaoke system that make it possible to know customer needs and market trends by grasping the use of information services.

Another object of the present invention is to provide a karaoke system capable of performing accounting operations even when providing pay information services.

Another object of the present invention is to provide a computer system and a karaoke system that are capable of sharing data to be used (e.g, image, musical sound, or sound source data) among files which provide services, in the case where a variety of information services such as commercial messages are rendered.

Another object of the present invention is to provide a karaoke system capable of quickly offering a desired service with simple operations. Another object of the present invention is to provide a karaoke terminal capable of easily accepting a karaoke request while an information service is offered.

To solve the above-described drawback, a computer system of the present invention is provided with storage means for holding a plurality of object files, each file including a program and information on the genre of music. The computer system selects an object file from the storage means and executes a program stored in the selected object file. The computer system further comprises retrieval means for retrieving object files classified in a specified genre, list generating means for generating a list consisting of titles that correspond to the object files retrieved by the retrieval means, and display means for displaying the list generated by the list generating means.

According to the present invention, the computer system is provided by the fact that each object file has title information for use in displaying a title that suits the contents of that object file, and that the list generating means generates the list on the basis of the title information contained in the object file retrieved by the retrieval means.

According to the present invention, the computer system is provided by comprising genre determination means for determining the specified genre in response to a user's operations.

A karaoke system of the present invention employs the computer system described above. The karaoke system is provided by comprising karaoke playing means which stores karaoke music information in the storage means, synthesizes a musical sound by reading the karaoke music information from the storage means, and produces an output by mixing the synthesized musical sound with a voice input through a mike. The karaoke system further comprises switching means for switching between the execution of the object file and the performance of karaoke music carried out by the karaoke playing means.

According to the present invention, the karaoke system is provided by the fact that the performance of karaoke music carried out by the karaoke playing means is described in the program of the object file as a selectable instruction.

According to the present invention, a computer system includes storage means for storing a plurality of object files, each file including a program and information on the genre of music, and that selects an object file from the storage means and executes a program stored in the selected object file, the improvement being provided by comprising: ID information reading means for reading ID information that includes personal information of a user; genre determination means for determining an individual genre corresponding to the personal information read by the ID information reading means; retrieval means for retrieving object files which fall within both a specified genre and the individual genre determined by the genre determination means; list generating means for generating a list consisting of titles that correspond to the object files retrieved by the retrieval means; and display means for displaying the list generated by the list generating means.

According to the computer system of the present invention, each object file has title information for use in displaying a title that suits the contents of that object file, and the list generating means generates the list on the basis of the title information contained in the object file retrieved by the retrieval means.

According to the computer system of the present invention, there is provided genre determination means for determining the specified genre in response to a user's operations.

A karaoke system that employs the computer system described above, includes karaoke playing means which stores karaoke music information in the storage means, which synthesizes a musical sound by reading the karaoke music information from the storage means, and which produces an output by mixing the synthesized musical sound with a voice input through a mike; and switching means for switching between the execution of the object file and the performance of karaoke music carried out by the karaoke playing means.

According to the karaoke system of the present invention, the performance of karaoke music carried out by the karaoke playing means is described in the program of the object file as a selectable instruction.

According to the karaoke system of the present invention, the ID information is stored in an ID card, and the ID information reading means is made up of an ID card reader.

To solve the above-described problem, a computer system of the present invention, includes storage means for storing a plurality of object files, each file including a program and information on the genre of music, as well as selecting an object file from the storage means and executing a program stored in the selected object file. The computer system is provided by comprising determination means for determining whether or not each object has been executed, and execution status storage means for storing a determination result, which is made by the determination means, for each object A computer system of the present invention, includes storage means for storing a plurality of object files, each file including a program and information on the genre of music, as well as selecting an object file from the storage means and executing a program stored in the selected object file. The computer system is provided by comprising determination means for determining whether or not each object has been executed, and number-of-times storage means for storing how many times each object has been executed, on the basis of a determination result of the determination means.

According to the present invention, the computer system is provided by further comprising menu generation means for generating a menu for the object which changes the sequence of display of menus on the basis of the number of times each object is executed that is stored in the number-of-times storage means.

A karaoke system of the present invention employs the computer system described above. The karaoke system is provided by comprising karaoke playing means which stores karaoke music information in the storage means, which synthesizes a musical sound by reading the karaoke music information from the storage means, and which produces an output by mixing the synthesized musical sound with a voice input through a mike; and switching means for switching between the execution of the object file and the performance of karaoke music carried out by the karaoke playing means.

To solve the above-described drawbacks, a karaoke system, according to the present invention, includes a computer system that selects an object file from storage means for holding a plurality of object files including programs and executes a program stored in the selected object file. The karaoke system is provided by comprising karaoke playing means which stores karaoke music information in the storage means, which synthesizes a musical sound by reading the karaoke music information from the storage means, and which produces an output by mixing the synthesized musical sound with a voice input through a mike; switching means for switching between the execution of the object file and the performance of karaoke music carried out by the karaoke playing means; cash inserting device that outputs information about the amount of money inserted by a user; determination means for determining whether or not the object file is executed or whether or not the karaoke playing means performs karaoke music by comparing the amount of money inserted by the user with a charge for the execution of the object file or the performance of karaoke music, if the execution of the object file or the performance of karaoke music carried out by the karaoke is a pay service; accounting means that permits the execution of the object file or the performance of karaoke music if the determination means has determined that the execution of the object file or the performance of karaoke music is allowable, and that displays a message so as to encourage the user to insert money as well as rendering the termination of the execution of the object file or performance of karaoke music selectable if the determination means has determined that the execution of the object file or the performance of karaoke music is not allowable; and the determination means that again determines whether or not the object file is executed or whether or not the karaoke playing means performs karaoke music, in consideration of newly received money information if the money information is output from the cash inserting device after the accounting means has encouraged the user to insert money.

According to the present invention, the karaoke system is provided by further comprising operation means for providing instructions regarding various processing operations in accordance with the user's operations; and operation invalidating means that invalidates specific operations, which are performed by operation means, under predetermined conditions after the accounting means has permitted the execution of the object file or the performance of karaoke music.

To solve the above-described problem, a computer system, according to the present invention includes storage means for storing a plurality of object files including programs, as well as selecting an object file from the storage means and executing a program stored in the selected object file. The computer system is provided by the fact that data referred to by the program of the object file are individually stored in the storage means as a resource file, and that an arbitrary resource can be specified by the program of each object file.

According to the present invention, the computer system is provided by further comprising information file receiving means that receives from the outside an information file consisting of the object file and the resource file, and that individually stores into the storage means the object file and the resource file contained in the received information file.

A karaoke system that employs the computer system, comprises karaoke playing means which stores karaoke music information in the storage means, which synthesizes a musical sound by reading the karaoke music information from the storage means, and which produces an output by mixing the synthesized musical sound with a voice input through a mike; and switching means for switching between the execution of the object file and the performance of karaoke music carried out by the karaoke playing means.

According to the present invention, the karaoke system is provided by the fact that the performance of karaoke music carried out by the karaoke playing means is described in the program of the object file as a selectable instruction.

To solve the above-described drawbacks, a karaoke system, according to the present invention, includes a computer system that selects an object file from storage means for holding a plurality of object files including programs and executes a program stored in the selected object file. The karaoke system is provided by comprising karaoke playing means which stores karaoke music information in the storage means, which synthesizes a musical sound by reading the karaoke music information from the storage means, and which produces an output by mixing the synthesized musical sound with a voice input through a mike; switching means for switching between the execution of the object file and the performance of karaoke music carried out by the karaoke playing means; an object file for use in displaying a menu that is stored in the storage means, and that includes a program for displaying a title list matching up with predetermined object files and a program for encouraging the execution of an object file when it is selected from the title list; and object file execution instructing means that provides an instruction for execution of the menu display object file when a predetermined operation is carried out by a user.

According to the present invention, the karaoke system is provided by the fact that the karaoke playing means produces a request queue which represents each requested sound each time karaoke music is requested, and synthesizes a musical sound by sequentially reading the karaoke music information in accordance with the order of the request queues, and wherein the object file execution instructing means produces an instruction for executing the menu display object file after the performance of the karaoke music corresponding to the last request queue has finished if the request queue is prepared when the predetermined operations are performed.

According to the present invention, the karaoke system is provided by the fact that the karaoke playing means produces a request queue which represents each requested sound each time karaoke music is requested, and synthesizes a musical sound by sequentially reading the karaoke music information in accordance with the order of the request queues, and wherein the object file execution instructing means produces an instruction for executing the menu display object file immediately after the karaoke music currently being played has finished if the request queue is prepared when the predetermined operations are performed.

According to the present invention, the karaoke system is provided by the fact that the performance of karaoke music carried out by the karaoke playing means is described in the program of the object file as a selectable instruction.

According to the present invention, the karaoke system is provided by the fact that if the performance of music carried out by the karaoke playing means is specified by the program of the object file, the performance of the music requested during the course of execution of an object file is prioritized in an interrupted manner, irrespective of a request queue which has already been generated when the performance is specified.

According to the present invention, the karaoke system is provided by the fact that if the performance of music carried out by the karaoke playing means is specified by the program of the object file, a second request queue is added so as to follow the request queue that has already been generated at the time of the initiation of the object file after the second request queue has been generated with respect to the music requested during the execution of the object file as well as the execution of the object file having finished.

As described above, by virtue of the computer system and the karaoke system of the present invention, menus can be automatically generated according to genre on the basis of variations in information services to be offered. Further, by virtue of the karaoke system of the present invention, a karaoke performance can be carried out while the information service is offered to the user.

As previously described, by virtue of the present invention, a menu can be automatically generated according to the individual status of the user.

As described above, by virtue of the present invention, it is possible to grasp the use of information services, whereby customers needs and market trends can be obtained. Particularly, by virtue of the computer system and the karaoke system of the present invention, the sequence of menus of information services changes depending on the use of information services, which makes it possible to maintain the ease of use.

As described above, by virtue of the present invention, accounting operations can be carried out appropriately even when pay information services are offered. Specifically, a karaoke system is capable of automatically carrying out a settling operation with respect to various accounting operations.

As described above, where a variety of information services such as commercial messages are offered, data to be used (e.g., image, musical sound, or sound source data) can be shared among files which provide service. Further, the utilization of data can also be managed easily.

As described above, by virtue of the present invention, it is possible to quickly access a desired service with simple operations. Further, by virtue of the present invention, it is possible to easily accept a karaoke request while an information service is offered.

BRIEF DESCRIPTION OF THE DRAWINGS

FIG. 5 is a diagrammatic representation of the details of an object used in the embodiment;

FIG. 6 is a diagrammatic representation of an example of a music object of the embodiment;

FIG. 7 is a diagrammatic representation of an example of "picture (#1) obj" of the embodiment:

FIG. 8 is a diagrammatic representation of an example of "text (#n) obj" of the embodiment;

FIG. 25 is an illustration of an exemplary display obtained in step SP4 shown in FIG. 24;

FIG. 26 is a diagrammatic representation of the tree structure of menus and information services;

DETAILED DESCRIPTION OF THE PREFERRED EMBODIMENTS

With reference to the accompanying drawings, a preferred embodiment of the present invention will be described hereinbelow.

Figure 1:
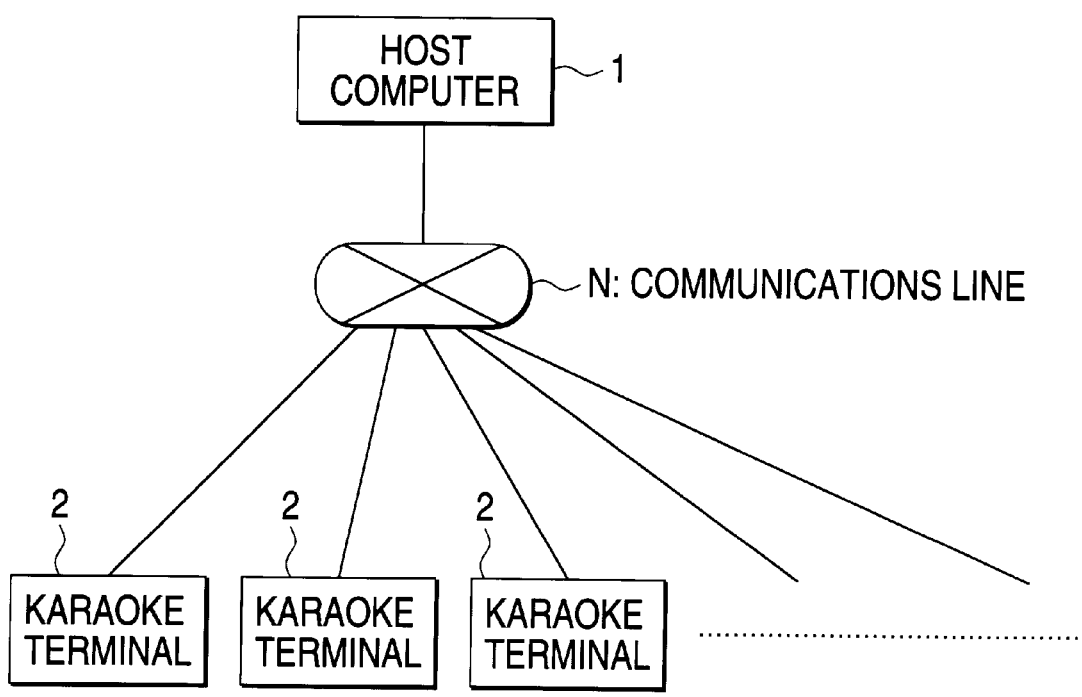
FIG. 1 is a block diagram which shows the overall configuration of a communication karaoke system according to one embodiment of the present invention.

A: Configuration of Communication Karaoke System According to an Embodiment of the Invention (1) Overall Configuration FIG. 1 is a block diagram which shows the configuration of a communication karaoke system according to one embodiment of the present invention. In FIG. 1, reference numeral 1 designates a host computer, and 2, 2, . . . designate a plurality of karaoke terminals connected to the host computer 1 through a communications line N. The host computer 1 periodically delivers karaoke data and information files (their details will be described later) to each of the karaoke terminals 2, 2, . . . . The karaoke data contain performance data (MIDI data), lyric data (which include data for use in synchronizing music with its lyrics), and image control data (data for use in selecting images available on the karaoke terminal 2). The karaoke terminal 2 displays lyrics based on the lyric data and image displays corresponding to image control data as well as performing an accompaniment based on the performance data.

The karaoke terminal 2 is designed so as to offer an operator a variety of information services in an interactive manner.

(2) Configuration of Karaoke Terminal

Figure 2:
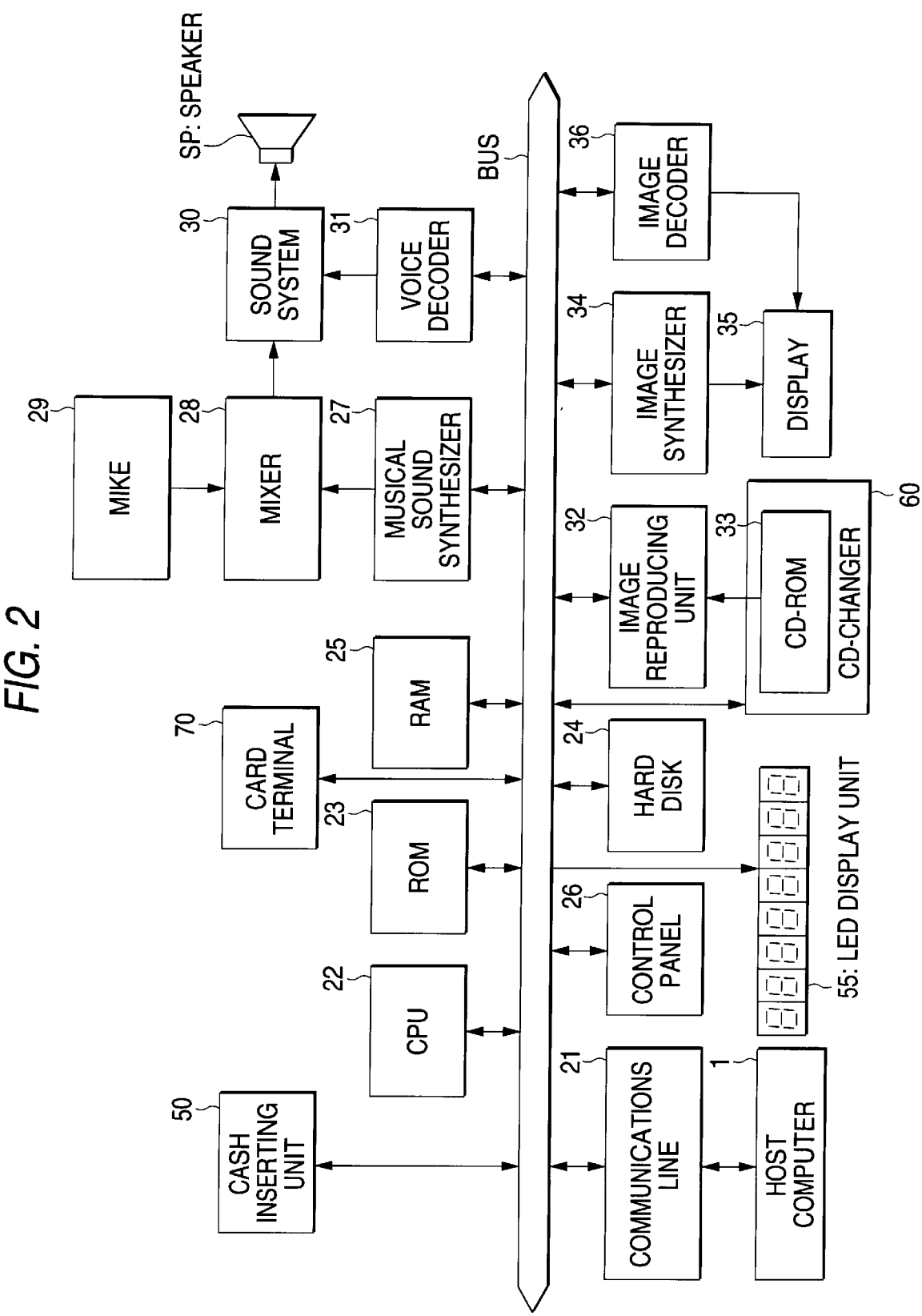
FIG. 2 is a block diagram which shows the configuration of a karaoke terminal 2 of the embodiment.

With reference to FIG. 2, the configuration of the karaoke terminal 2 will be described.

In FIG. 2, reference numeral 21 designates a communications interface, such as a modem or an ISDN (Integrated Services Digital Network), connected to the host computer 1 through the communications line N, and 22 designates a CPU (Central Processing Unit) which executes a system program stored in ROM 23 and controls devices connected to the CPU through a bus BUS. The CPU 22 carries out a variety of service operations by executing the information file as well as the performance of music and display of lyrics based on the karaoke data.

Reference numeral 24 designates a hard disk which holds the karaoke data and information file groups fed from the host computer 1. Reference numeral 25 designates RAM which is used as a work area of the CPU 22.

Reference numeral 26 designates a control panel which detects the action of an operator pressing a key switch (e.g., a start key, a cancel key, an up/down key, or ten-keys). This control panel 26 enables selection of an information selection menu displayed on the display unit 36 as well as music selection (i.e., the entry of a music number), the initiation and termination of music performance, instruction operations for karaoke performance purposes such as volume control.

Figure 3:
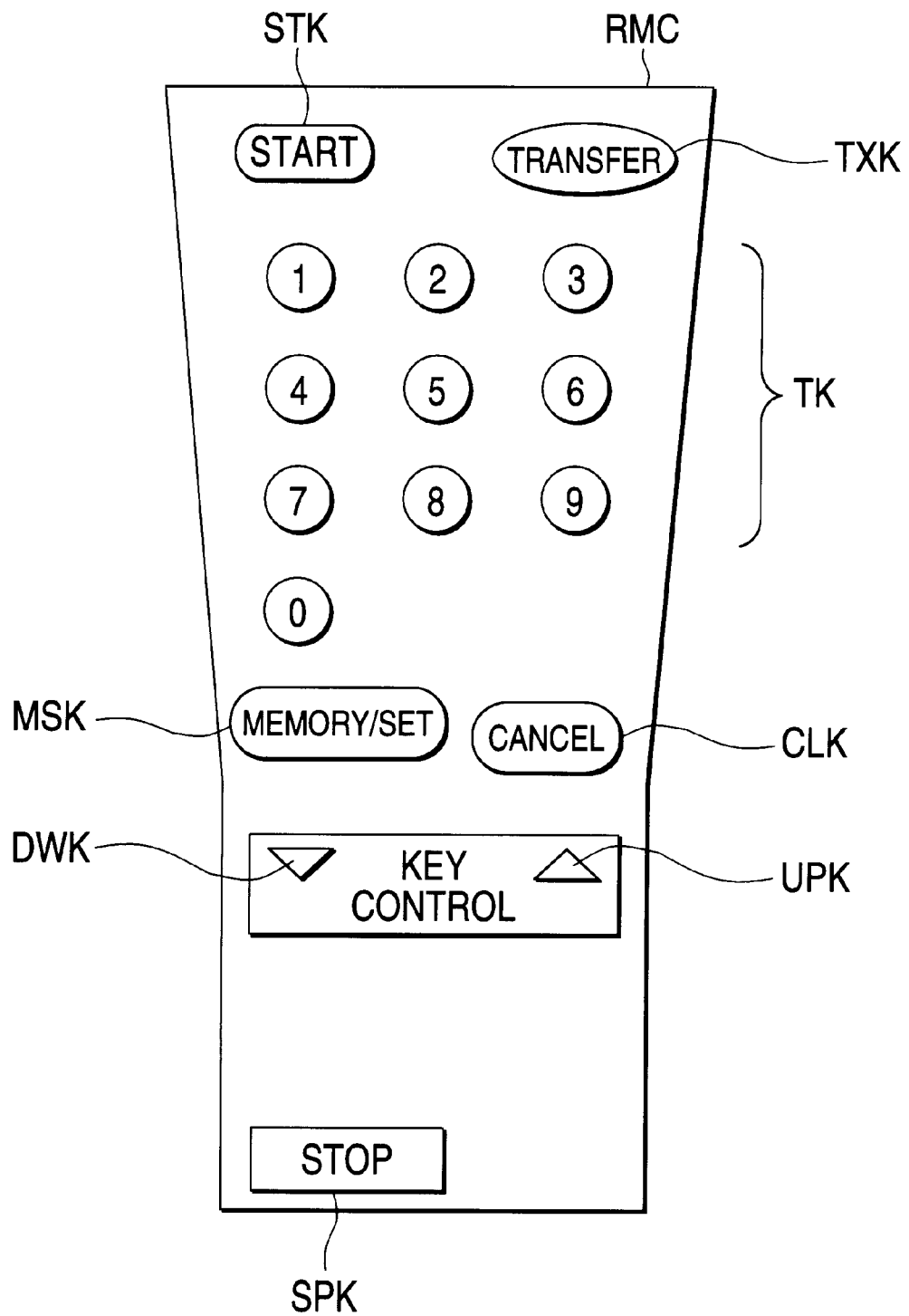
FIG. 3 is a front view of a remote control unit RMC which shows the front panel of the remote control unit of the embodiment.

The control panel 26 has a receiving section for receiving a signal sent from a remote control unit RMC shown in FIG. 3. The remote control unit RMC is provided with a start key STK, a cancel key CLK, an up key UPK, a down key DWK, ten-keys TK, a transfer key TXK, a memory set key MSK, and a music termination key SPK, as shown in FIG. 3. In this way, the remote control unit RMC has keys which are the same as those of the key switches provided in the control panel 26, which allows the remote control unit RMC to carry out the same operations as the control panel 26.

The remote control unit RMC incorporates memory (not shown). Information about the ten-keys TK is transferred to the control panel 26 once it has been stored in the memory. In this event, the ten-keys TK are used for specifying the number of karaoke music. For example, if a music number is 12345, the ten-keys TK are pressed in that order; namely, 1, 2, 3, 4, and 5. Subsequently, the memory set key MSK is pressed. As a result, numerical values corresponding to 12345 are temporarily stored in the memory. A transmission signal corresponding to the numerical values stored in the memory is transferred to the control panel 26 by pressing the transfer key TXK.

For the other keys provided on the remote control unit RMC, a transmission signal corresponding to a pressed key is immediately output. Functions of these keys will be described later.

In FIG. 2, reference numeral 27 designates a musical sound synthesizer which generates a musical sound signal corresponding to the MIDI information (the MIDI information contained in the karaoke data or the information file) serially fed from the CPU 22. The thus generated musical sound signal is output to a mixer 28. The mixer 28 mixes the musical sound signal fed from the musical sound synthesizer 27 with a voice signal input from a mike 29. The thus-mixed signal is output to a sound system 30. In the event of the performance of background music, the mixer 28 allows the musical sound signal fed from the musical sound synthesizer 27 to be directly output to the sound system 30.

Reference numeral 31 designates a voice decoder which converts ADPCM information (for use in voice information services) serially read from the information file by the CPU 22 into an analogue audio signal. The thus-converted signal is output to the sound system 30. The sound system 30 amplifies the musical sound signal received from the mixer 28 or the audio signal received from the voice decoder and outputs the music sound or the voice from the speaker SP.

Reference numeral 32 designates an image reproducing unit which reads image information corresponding to image control data within the karaoke data specified as one to be reproduced from CD-ROM 33 in a CD changer 60 and transfers the thus-read image information to the image synthesizer 34. The image synthesizer 34 merges the image information fed from the image reproducing unit 32 and font information corresponding to lyric information in the karaoke data read by the CPU 22 (the font information is stored in the image synthesizer 34) into one data item. The thus-merged data are displayed on the display 35. As a result, lyrics are superimposed on the background. The image synthesizer 34 expands an image to be displayed in the form of a bit map in VRAM (video RAM) and outputs the thus-expanded image to the display 35.

Reference numeral 36 designates an image decoder. The image decoder 36 decompresses compressed image information of a stationary image, such a menu or icons, or motion pictures (i.e., image information in compliance with MPEG, JPEG or the like) read from the information file. The thus-decompressed image information is then converted into an analog image signal. This analog image signal is then displayed on the display 35.

Reference numeral 50 is a cash inserting device which allows a user to insert coins and bills. The cash inserting device 50 determines whether inserted coins or bills are genuine or fake, as well as detecting the amount of money. The cash inserting device 50 feeds a signal representing the detected amount to the CPU 22. Further, the cash inserting device 50 discharges change under control of the CPU 22.

Reference numeral 55 designates an LED display unit attached to the front of the main body of the karaoke terminal. The LED display unit 55 comprises 7-segment LEDs having a number of figures. The illumination of the LED display unit 55 is controlled by the CPU 22. Reference numeral 60 designates a CD changer which selects CD (compact disk) or the CD-ROM 33 under control of CPU 22 and reads music information from the specified track or image information in the manner as previously described. The thus-read image information is sent to the image reproducing unit 32. Reference numeral 70 is a card terminal which deals with an ID card or a credit card. The card terminal 70 reads information from the card or determines whether the card is valid or invalid.

(3) Contents of Information File

In the present embodiment, it is possible to offer a variety of information services on the basis of the information file in addition to an ordinary karaoke performance. The information file comprises a program portion which is called a script and a reference data portion which is called a resource (i.e., a portion which comprises performance data, image data, or the like). A variety of information services are offered by the CPU 22 executing the script.

In this event, the script is described in a predetermined language system and consists of a group of units of processing called objects. Each object is arranged such that resources are referred to, as required. This point will be described later with reference to FIG. 10.

Figure 4:
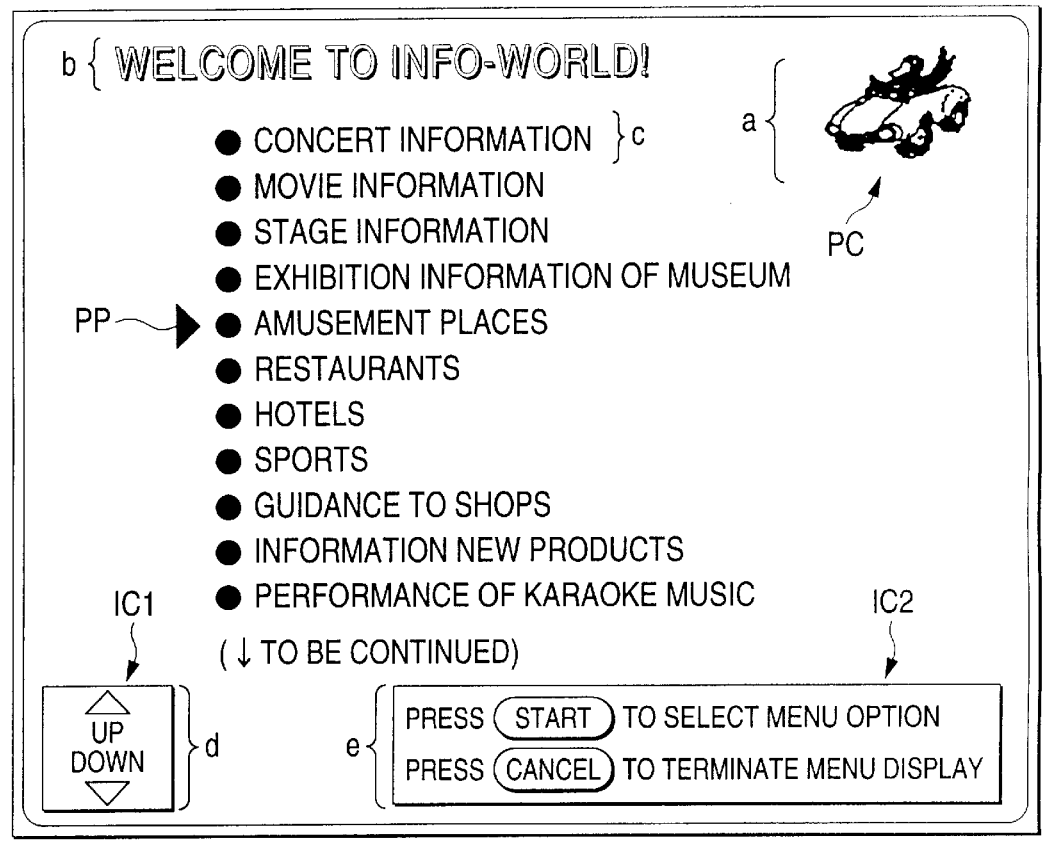
FIGS. 4A and 4B illustrate one example of an information service screen which is displayed in the embodiment.
Figure 4:
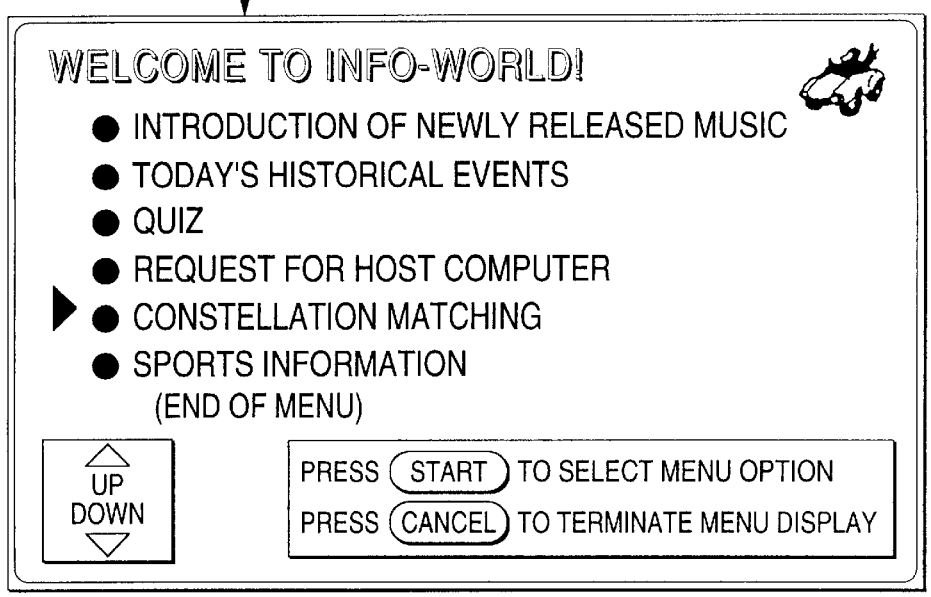

FIG. 4 is one example of an information service menu screen displayed on the karaoke terminal of the present embodiment. With reference to FIG. 5, an object corresponding to the control of that screen display will be described.

The object shown in FIG. 5 is called a page object which is one example of an object for controlling one screen display. Each object (that is, a part of the script) is described in a predetermined language, as previously described. For convenience of explanation, the function of a program will be described using Japanese representations corresponding to the descriptions written in a predetermined language.

To begin with, a box entitled "New" is initially referred to when the object is started. Details of the first control of the object are described in this box. In the case of the illustrative example shown in the drawing, various instructions related to a drawing are described.

"Picture (#1) obj" written in the first line of this box is intended to specify an object that includes descriptions related to the control of display of the picture. Various objects that control the display of pictures are described so as to correspond to pictures to be displayed. The objects are provided with arguments (#1), (#2), . . . so that a desired object can be called by specifying the argument.

FIG. 7 shows an example of descriptions related to "Picture (#1) obj". The descriptions include a line for specifying a file to be used and a line for specifying the position at which the picture is to be drawn. A "#1 image resource" specified as a file is an image data file in which predetermined image data are recorded. As previously described, the image resource is arranged so as to be called and referred to by the script. In this event, as in the object, the image resources are also provided with arguments such as (#1), (#2), . . . so that a desired resource can be called by use of the argument.

The "#1 image resource" in this embodiment is image data of a picture of an automobile carrying an animal. Those image data are displayed at the coordinates specified in the second line in FIG. 7. As a result of the execution of the control according to these descriptions (i.e., as a result of the control being executed by the CPU 22), a character appears in the area "a" shown in FIG. 4A.

"Text (#1) obj" and "Text (#3) obj" written in second and third lines of the box entitled "New" shown in FIG. 5 indicate objects which describe the control of display of characters. Various objects that control the display of characters are described so as to correspond to characters to be displayed. As in the case of the picture objects, these objects are provided with arguments (#1), (#2), . . . so that a desired object can be called by specifying the argument.

FIG. 8 shows an example of the descriptions of "Text (#n) obj". As are illustrated in the drawing, the descriptions include a string line for specifying characters to be displayed and a line for specifying the position at which the characters are to be displayed. The text object does not include the specification of a file, and characters to be displayed are directly specified by the string line. These text objects are provided with arguments (#1), (#2), . . . so that a desired object can be called. "Welcome to Info-World!" is written in the area "b" in the box shown in FIG. 4A. The area "c" has a description reading "Concert Information". Consequently, the string lines of the text object that correspond to these indications are described as string="Welcome to Info-World" and string="Concert Information". The text object further includes a string for specifying a font of characters to be displayed (not shown). As a result, the characters can be displayed in various fonts.

For the other menu title displays shown in FIG. 4A; namely, "Movie Information", "Stage Information" . . . text objects (not shown) which are the same as the above-described text object are described in the "New" box shown in FIG. 5.

As in the above-described case, the picture and text objects are described with regard to the pictures and characters shown in the icon display sections designated by "d" and "e" shown in FIG. 4A.

The block entitled "Delay" shown in FIG. 5 defines an operation (action) to be executed after the lapse of a predetermined period of time since the page object shown in FIG. 5 was started. In the illustrated example, background music is specified to be played after a lapse of five seconds. In short, (5S) written in this box defines the lapse of five seconds, and "BGM=music name (#1) obj" defines the performance of background music by execution of a music object (designated by argument #1).

FIG. 6 shows an example of the descriptions related to the music object. In this drawing, "Play=CD" written in the first line is an instruction for instructing the karaoke terminal to play music by actuating a CD (not shown) in the CD changer 60 shown in FIG. 2. The descriptions also comprise descriptions for specifying details with respect to the CD changer such as a disk number and a music track to be selected. To simplify explanations, they are omitted from the drawing. The karaoke data "Play=#1" written in the second line shown in FIG. 6 represent an instruction for causing the karaoke terminal to read a piece of music having a number one from among several pieces of music. In this event, the karaoke data constitute part of the resource.

Instructions for defining various performances are described in the previously mentioned manner. In some cases, the descriptions comprise an instruction "end" for specifying the action to be executed when the karaoke performance has finished. The instruction comprises, for example, the shift of processing to another object, repetition of the operation by calling the same object again, or repetitive play of the current music.

Menu options related to various buttons provided in the display screen are described in a box entitled "Selector" shown in FIG. 5. First, the buttons displayed in the screen are registered in this box. In the example shown in FIG. 5, elements for specifying each of the buttons, such as button ID #1, ID #2, . . . are described. Black circular dots are provided on the left side of each of eleven titles from "Concert Information" to "Performance of Karaoke" in FIGS. 4A and 4B. These black dots are defined as buttons in order from the top.

In the box "Selector" shown in FIG. 5, actions are defined with respect to three conditions of each button; namely, a "marked" condition, an "unmarked" condition, and a "selected" condition. The "marked" condition is one in which a pointer appears adjacent to the button. The "unmarked" condition is one in which the pointer does not appear adjacent to the button. The "selected" condition is one in which the button is selected (i.e., a condition in which the service corresponding to the button is executed). The movement of the pointer and the selection of each button are carried out by pressing buttons provided on the control panel 26 or the remote control unit RMC. Operation guides of each button are displayed in the icons IC1 and IC2 shown in FIGS. 4A and 4B.

For example, the up key UPK or the down key DWK (see FIG. 3) are pressed to move a pointer PP up or down in accordance with the display of the icon IC1. To determine the button, the start key STK (see FIG. 3) is pressed in accordance with the display of the icon IC2. Similarly, in order to terminate the menu shown in FIG. 4, the cancel key (CLK) is pressed.

The descriptions written in the area described as "marked condition" shown in FIG. 5 comprise an instruction for displaying the pointer PP (see FIG. 4) at the position where the button is situated. This instruction is intended to inform the operator that the button has already been selected by indicating the pointer PP. Background music associated with the title of the button is played, as necessary. In this case, the music object (music (#n) obj) is described in the box, as shown in FIG. 5.

An instruction for erasing the display of the pointer PP, or the like, is written in the area described as an "unmarked condition". The pointer PP is displayed adjacent to only the selected button.

The details of operations that are executed when the current button is determined by selection are described in the area described as "selected condition". The details are usually described in the form of the call of a predetermined object.

Figure 9:
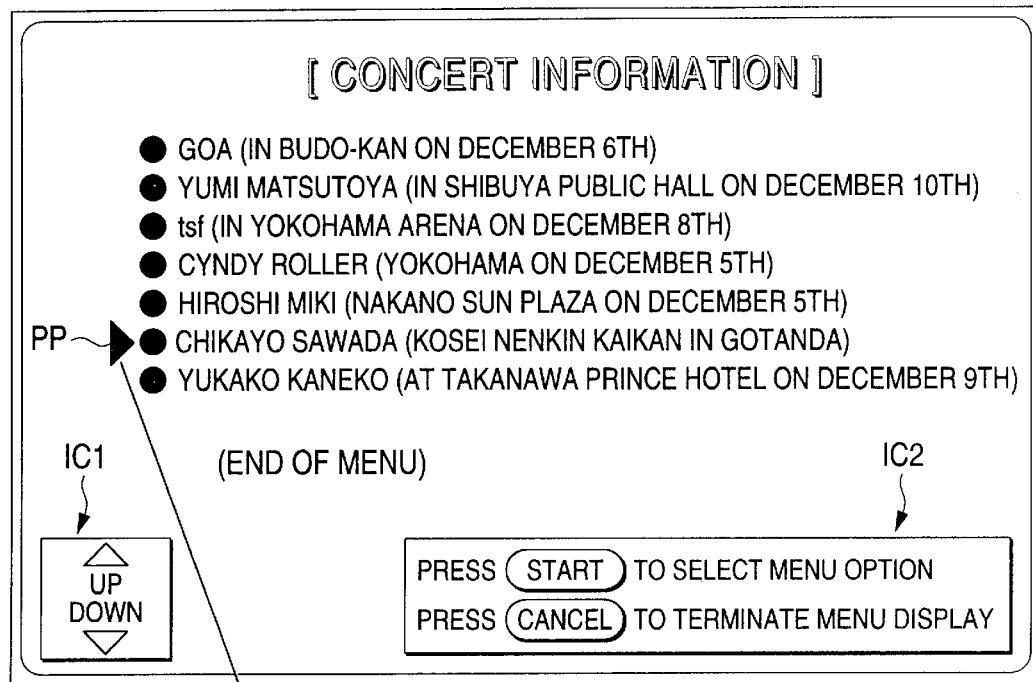
FIGS. 9A and 9B are diagrammatic illustrations of an example of an information service screen displayed in the embodiment.
Figure 9:
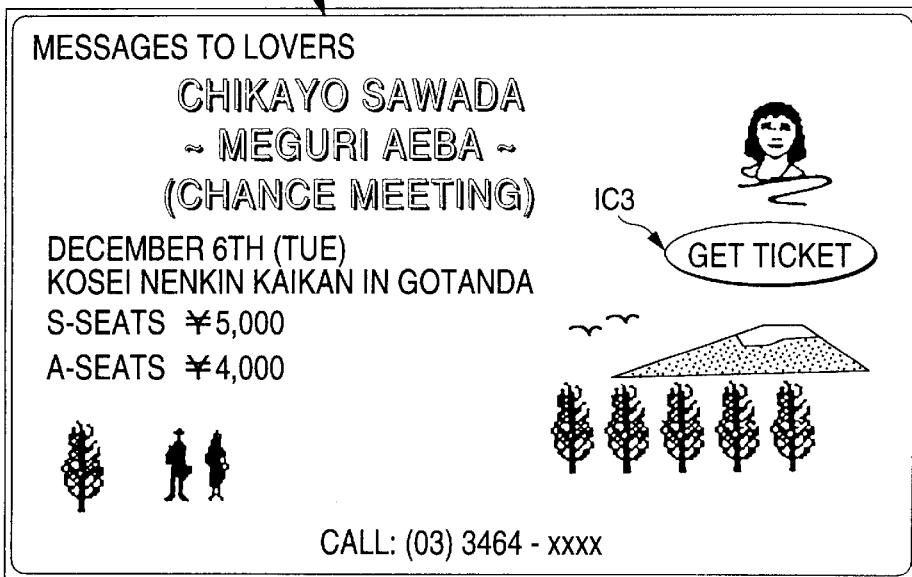

For instance, when the "Concert Information" button is selected, an object which controls the menu display of such concert information as shown in FIG. 9A is executed.

Further, if a button "Chikako Sawada" is selected from the screen buttons, as shown in FIG. 9A, an object which controls an information screen related to the concert of that singer is executed. As a result, such a display as shown in FIG. 9B appears on the screen.

If the pointer PP is further moved down from the button "Karaoke Performance" on the screen shown in FIG. 4A, the remaining menus will appear on the screen (see FIG. 4B). In other words, if the pointer PP moves further down from the "Karaoke Performance", an object for displaying the screen shown in FIG. 4B is executed.

The examples of the page objects have been described as examples of descriptions of the objects. Some objects do not include the descriptions related to "Delay" box. As is evident from the above descriptions, an object for realizing a predetermined object (e.g., screen control) is implemented by a collection of small objects.

Figure 10:
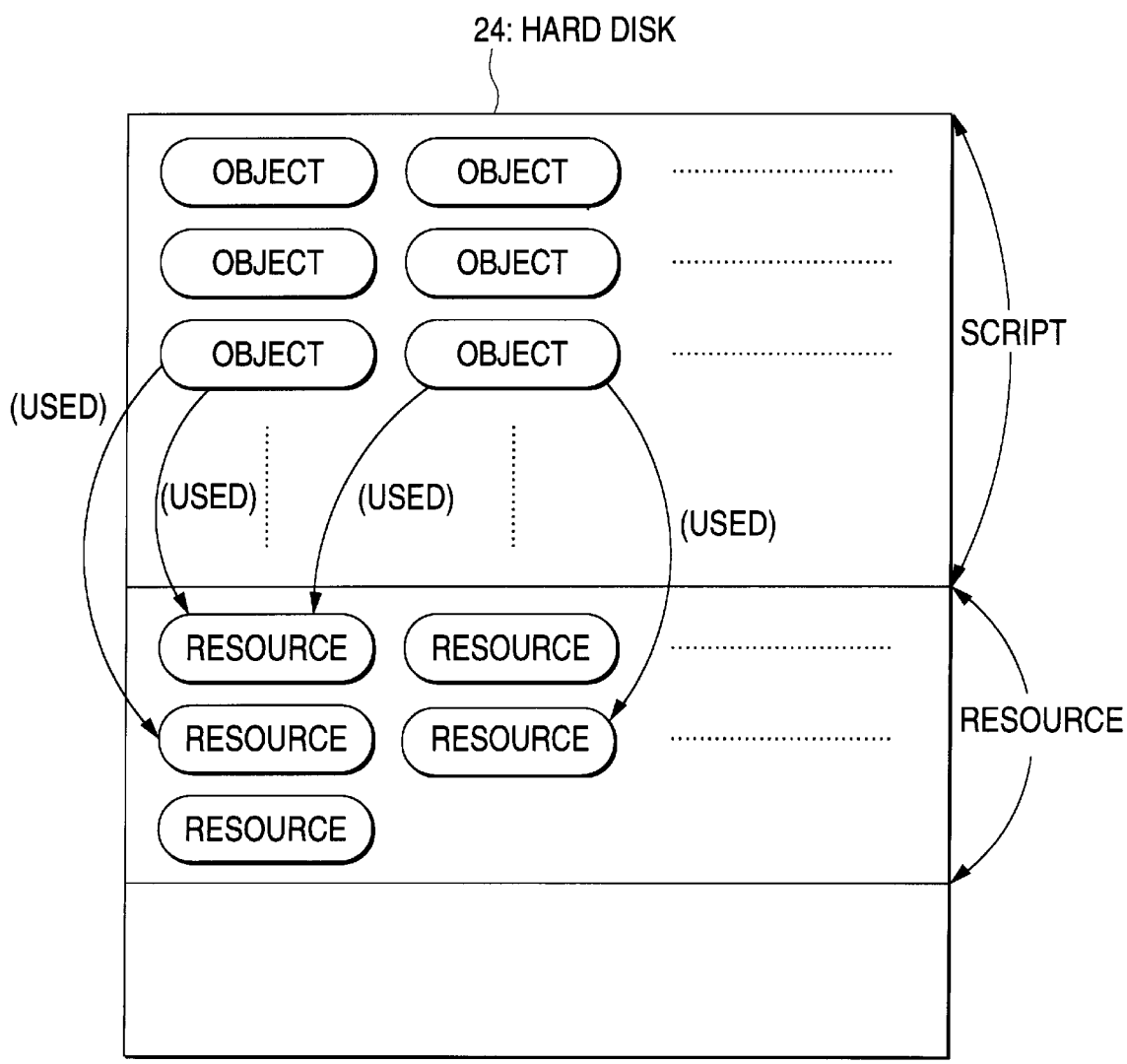
FIG. 10 is a diagrammatic representation of a hard disk 24 which shows the state of storage of scripts (objects) and resources in the hard disk.

Although the script consists of a group of objects, the scripts and the resources are stored in the hard disk 24 so as to be separated from each other. In short, the scripts that form the program and the resources that form reference data are stored in the hard disk while being separated from each other. Consequently, it becomes possible to specify an arbitrary resource in each object. FIG. 10 diagrammatically shows the storage of scripts (objects) and resources in the hard disk 24. As shown in this drawing, several objects can share an identical resource with one another. As a result, it is possible to make the transmission of data from the host computer 1 more efficient as well as saving the storage area of the hard disk 24.

B: Operation of the Communication Karaoke System of the Embodiment (1) Initiation of Information Services Next, operation of the communication karaoke system having the above-described construction will be described. The following descriptions are based on the assumption that a group of information files and karaoke data have already been transmitted from the host computer 1 to the karaoke terminals 2 to a certain degree.

To being with, the power of the karaoke terminal 2 is turned on, and a system program is loaded into the ROM 23 from the CPU 22. The thus-loaded system program is executed, whereby the CPU 22 enters a karaoke performance standby condition (i.e., a karaoke mode) and waits for the entry of a music number.

When a music number is input by operating the remote control unit RMC or the control panel 26, the karaoke data related to that music are read from the hard disk 24. The performance of that music and the display of its background and lyrics are carried out. The user can enjoy singing a song using the mike 29 in tune with the performance and display.

On the other hand, if a predetermined music number, e.g., 8000, is entered, the CPU 22 detects this entry and enters an information service mode. In other words, if the music number 8000 is entered, an object associated with a pre-stored menu display (e.g., a menu display shown in FIG. 4A) is executed.

Figure 11:
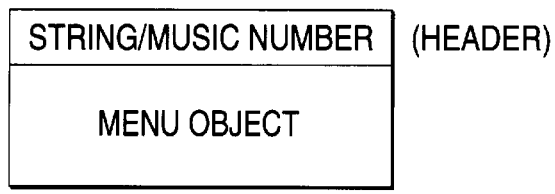
FIG. 11 is a diagrammatic representation of the data structure of a menu object of the embodiment.
Figure 12:
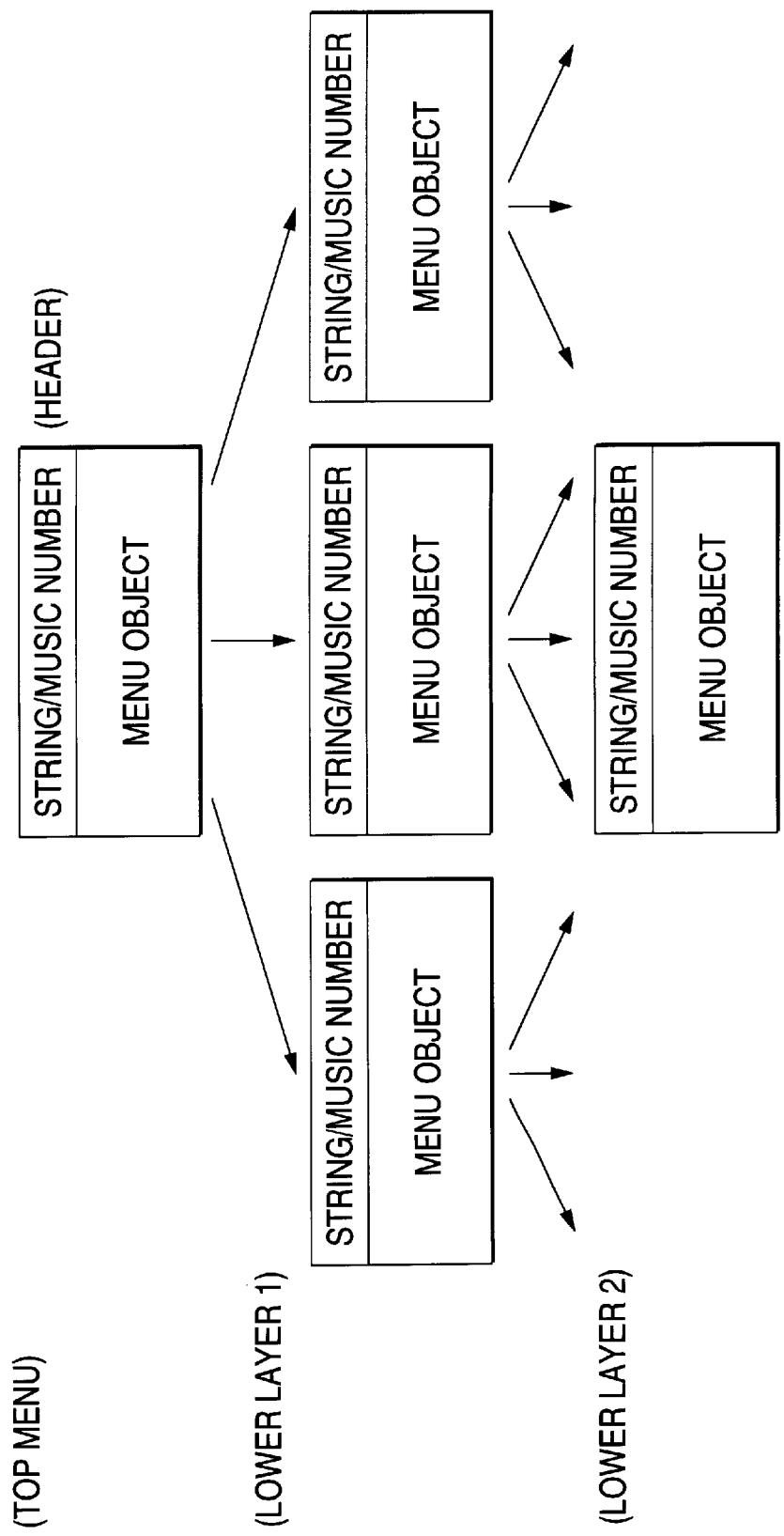
FIG. 12 is a diagrammatic representation of one example of a hierarchical menu of the embodiment.

A music number is written in a header of the object of the menu of the present embodiment, as shown in FIG. 11. The description of the header comprises a title in the form of a string and two music number displays. The menu has a multilayer structure, as shown in FIG. 12. A music number is written in the header of each object in each layer of the menu. The hierarchy of the menu has the following structure. Provided that the menu shown in FIGS. 4A and 4B is the top menu, the menu shown in FIG. 9A which appears as a result of the selection of the "Concert Information" from the titles of the top menu is a first menu of a lower layer. In this case, the header of the object for displaying the menu shown in FIG. 9A as well as the header of the object for displaying the top menu shown in FIGS. 4A and 4B also comprise the description of music numbers.

The header of the object of a service also comprises the description of a music number (not shown). For example, the screen display shown in FIG. 9B has information services of a concert, and an object for controlling this display also has a description of a music number.

In some cases, the karaoke music corresponding to an input music number, e.g., 8000, is in the course of performance or has already been reserved. The order of performance of music in such a case is controlled in the following manner.

Figure 13:
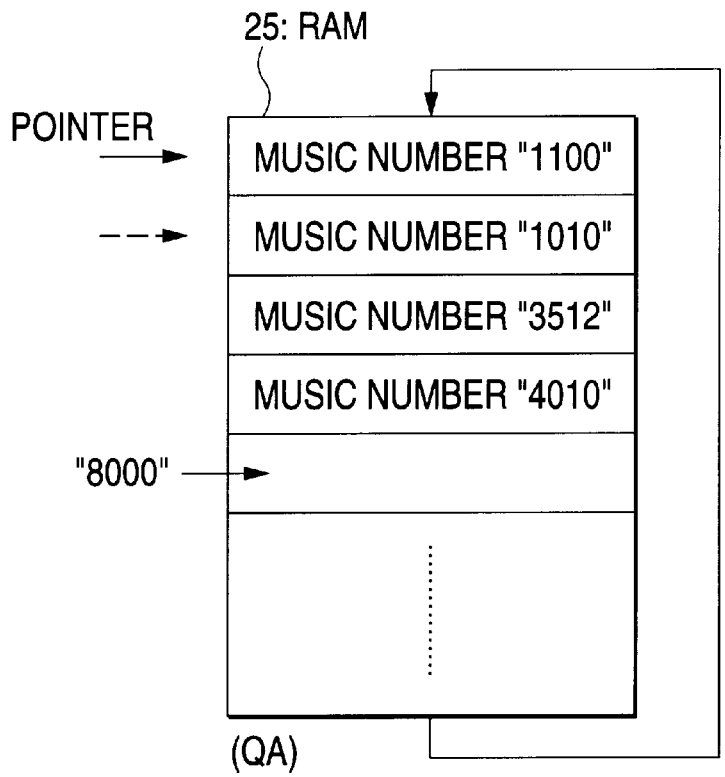
FIG. 13 is a diagrammatic representation of a queue registration area QA of the embodiment.

If there is a request for a piece of karaoke music, the number of the requested music is registered in a predetermined location within the RAM 25 shown in FIG. 2 as a "queue". Where a plurality of pieces of music are reserved, queues are registered in the RAM 25, e.g., in such a manner as shown in FIG. 13. In a queue registration area QA shown in FIG. 13, the music number indicated by the arrow-shaped pointer is the reserved music to be played next. After the music being currently played has finished, a music number is read from the address indicated by the pointer. Then, the performance of the music is started. The pointer then moves to the next address. Four pieces of music are already reserved in the list shown in FIG. 13. If the fifth music is reserved, the number of that music is written into the address next to the fourth music. The queue registration area QA shown in FIG. 13 has a ring buffer structure. A queue will be registered in the top address if the preceding queue has been registered in the end address.

However, a new music number is prohibited from being written into the address whose music has not finished undergoing rendering. If the queue registration area QA is already full, new reservations will not be accepted.

If a music number of the information service menu is reserved in such a state as shown in FIG. 13, the music number of the information service menu (e.g., 8000) is registered in the queue registration area QA as the fifth reserved music. Consequently, the music number of the information service menu is read after the fourth reserved music has finished undergoing rendering. The top menu is then displayed. If the ordinary reservation of karaoke music is carried out after a music number of the information service menu has been reserved, a queue of that music is registered in the address next to the address of the music number of the service menu as in the case of the ordinary reservation processing.

Figure 14:
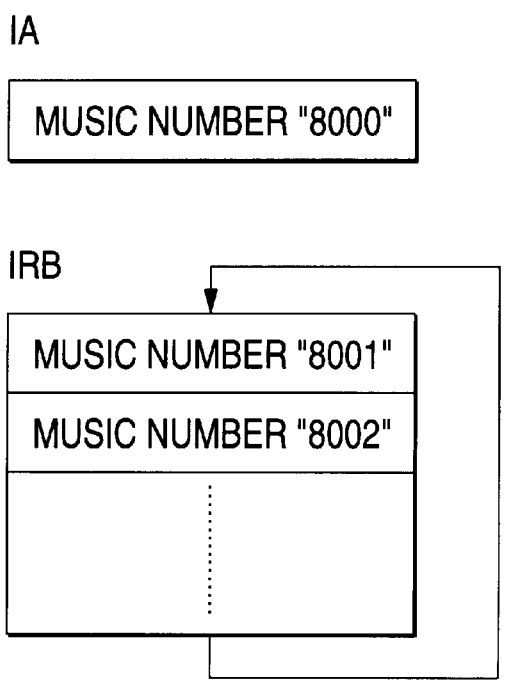
FIG. 14 is a diagrammatic representation of an interruption area IA and an interruption ring buffer IRB.

The communication karaoke system of the present embodiment has another queue management mode. In this queue management mode, the queue of the information service menu is not accepted after music has been reserved, but the information service menu is started by interruption immediately after the music currently being rendered has finished. For example, in this case, an area for interruption purposes IA is ensured in the RAM 25, as shown in FIG. 14. If a music number of the information service menu is entered, the music number is detected, and the thus-detected music number is registered in the area IA. If certain karaoke music is currently rendered, the information service menu of the music number written in the area IA is displayed in an interrupting manner after the karaoke music has finished. After the completion of the information service, the next queue (e.g., the performance of karaoke music) that has been in a standby mode during the interrupt is processed. The music number of the information service written into the area IA is inserted into the queue registration area QA of the RAM 25 shown in FIG. 13 in an interrupting manner. The order of queues shown in FIG. 13 may be rewritten.

In contrast, an interruption ring buffer IRB may be set in the RAM 25 for accepting interrupts related to the information service menu, as shown in FIG. 14, so as to sequentially accept a plurality of interrupts. Even in this case, the sequence of queues shown in FIG. 13 may be changed by processing the next queue in the queue registration area QA after all the queues registered in the interruption ring buffer IRB have been completed or inserting the queues of the interruption ring buffer IRB into the queue registration area QA in an interrupting manner.

The objects of menus or information services in each layer are assigned music numbers. Hence, it is possible to directly call a menu in an arbitrary layer without calling the top menu or directly start a desired service. In this case, the processing of a queue may be executed in two ways; namely, a queue is accepted as the last queue of the sequence of reserved queues, and a queue is inserted into the sequence of reserved queues in an interrupting manner. Either of the two methods may be arbitrarily selected. The method is selected as a result of selection of only a processing mode of the CPU 22 by pressing a predetermined button of the control panel 26.

(2) Automatic Generation of Menu

The menu option (title) of each of the previously described menus and the expansion of lower-order menus are fixed. In this embodiment, the CPU 22 is provided with a mode for automatically generating a menu in accordance with a predetermined algorithm. The generation of the automatic menu will be described.

Figure 15:
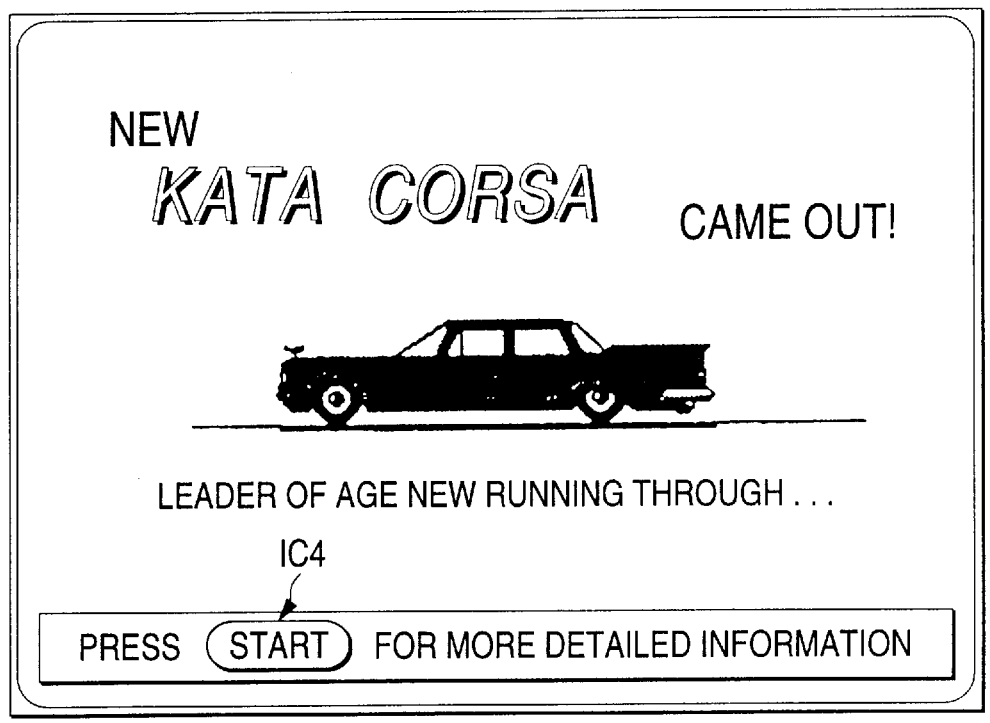
FIG. 15 is a diagrammatic illustration of one example of a service screen for advertising an automobile.
Figure 16:
FIG. 16 is a diagrammatic illustration of one example of a service screen for introducing newly released music.

To begin with, the delivery of each information service will be described. The information services of the present embodiment comprise a variety of advertisements, games, and information. They are classified according to genre. Each genre of "advertisements" or "games" has lower-order genres, such as, adult, child, lady's, and men's use. FIG. 15 shows one example of an information service screen for advertising automobiles, and FIG. 16 shows another example of the information service screen for introducing new music.

Figure 17:
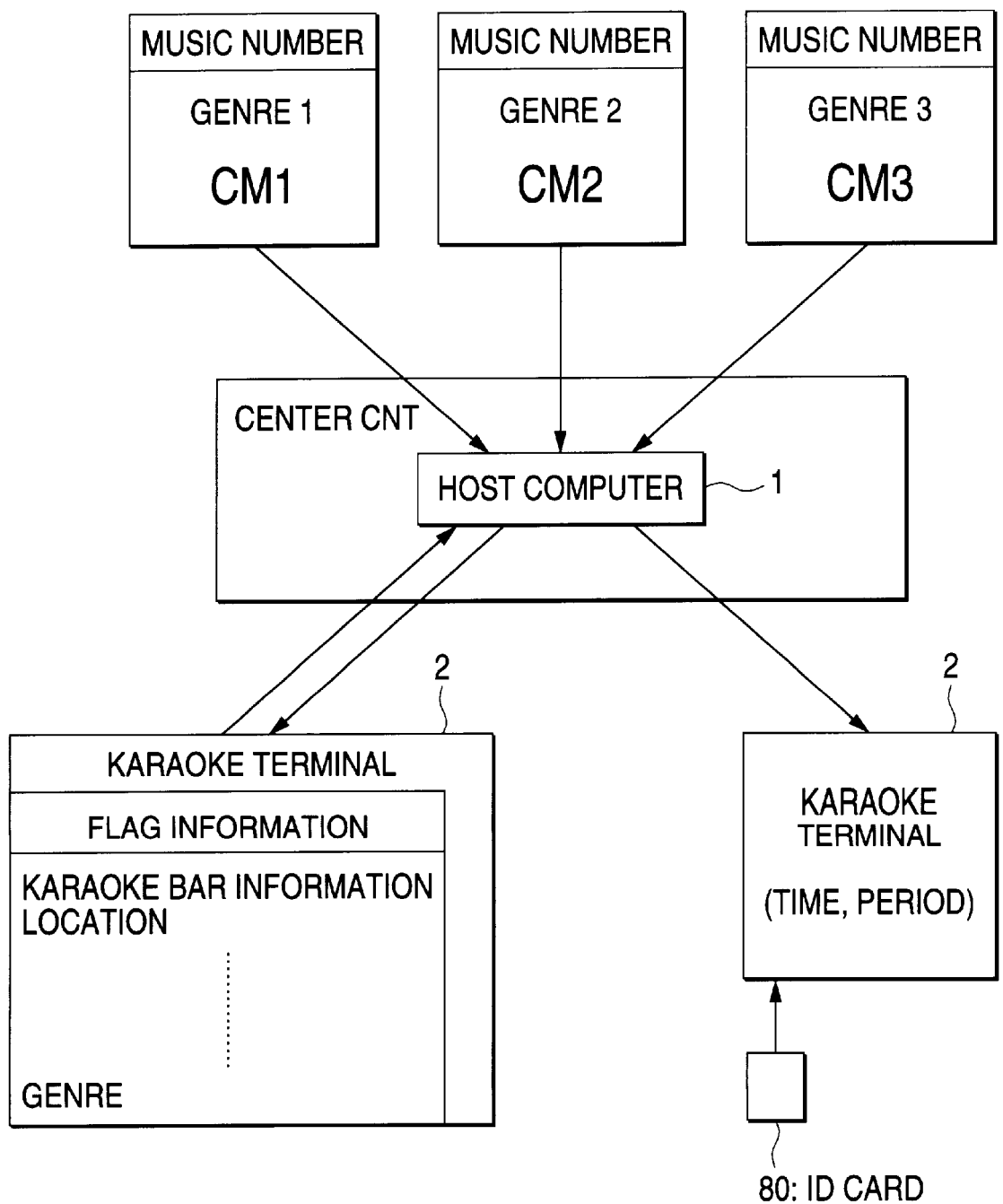
FIG. 17 is a diagrammatic representation of the delivery of advertisement information files produced by an advertising agent to the karaoke terminal.

The above-described service information related to advertisements, games, or the like, is produced by an advertising agent. The thus-produced service information is represented by a combination of scripts and resources. The service information is in the state in which it can be decoded and executed by the CPU 22. FIG. 17 is a diagrammatic representation showing the delivery of advertisement information files produced by advertising agents. In the drawing, CM1, CM2, and CM3 are advertisement information files produced by the advertising agent. They consist of the previously described scripts and resources. A header of the advertisement information file has descriptions of a music number and a title. In this case, the title is described in the previously described string line.

The information file shown in FIG. 17 is transmitted to the host computer installed in the center CNT. The host computer 1 grasps all the information files. In this event, the genre information may be included in the information files. Further, a correspondence table between music numbers and genres may be fed to the host computer 1. Moreover, the host computer 1 can set genres for each information file.

The information file can be delivered to the karaoke terminal 2 by two methods. According to the first method, the karaoke terminal 2 sends, as flag information, karaoke bar information [the type of bar (e.g., a compartment-style karaoke bar, a public bar . . . )] and associated information which represents the location (the places of the karaoke bars) and desired genres to the host computer 1, as required. The host computer 1 recognizes the genres of advertisement that are suitable for that karaoke terminal 2. Only the information files associated with these genres of advertisement are delivered to the karaoke terminal 2. Consequently, the karaoke terminal 2 can receive only the information files tallying with the conditions of each karaoke bar and the tendency of customers of that karaoke bar, which enables effective advertising.

According to the second method, the host computer 1 delivers all the information files to the karaoke terminal 2. Information comprising time (such as the morning, the afternoon, or midnight) and periods (such as seasons, the summer vacation, or the new year vacation) is entered from the karaoke terminal 2. Among the information files, only the information files corresponding to the above-described information are selectively used. In this event, a table defining which of the genres is suitable for the time and periods has previously been stored. Where an ID card 80 shown in FIG. 17 is used, only the information files corresponding to the personal information recorded in that ID card are made available. In this case, the information such as gender, birth date, and favorite genres of music is written into the ID card 80. The card terminal unit 70 shown in FIG. 2 reads that information and transfers the thus-read information to the CPU 22. The CPU 22 identifies the age and gender of the user and, then, selects appropriate genres based on the identification result. The CPU 22 makes only the information files corresponding to these genres available.

Although the advertisement information files are used as examples in the above descriptions, games and other information files are delivered and selected in the same manner.

As a result of the delivery and selection of the information files, the information files delivered to the karaoke terminal 2 and the information files that are available at the karaoke terminal 2 change variously. Accordingly, the menu to be shown should be changed so as to reflect that change. Particularly, in the case of the use of the ID card 80, the available information files differ depending on the user, and hence it becomes even more necessary to change the menu so as to match up with the information files.

For this reason, the menu is automatically generated in this embodiment. The automatic generation of a menu will be explained hereinbelow, taking the automatic generation of a menu using the ID card 80 as an example.

First, a karaoke user inserts the ID card 80 into the card terminal 70 shown in FIG. 2. The card terminal 70 reads ID information from the ID card 80 and feeds the thus-read ID information to the CPU 22. The CPU 22 selects corresponding genres as a result of identification of the age and gender of the user from the received ID information. If the user is a minor, the genres suitable for the minor will be selected. In other words, for example, the genres other than the genres for adult use are selected.

Figure 18:
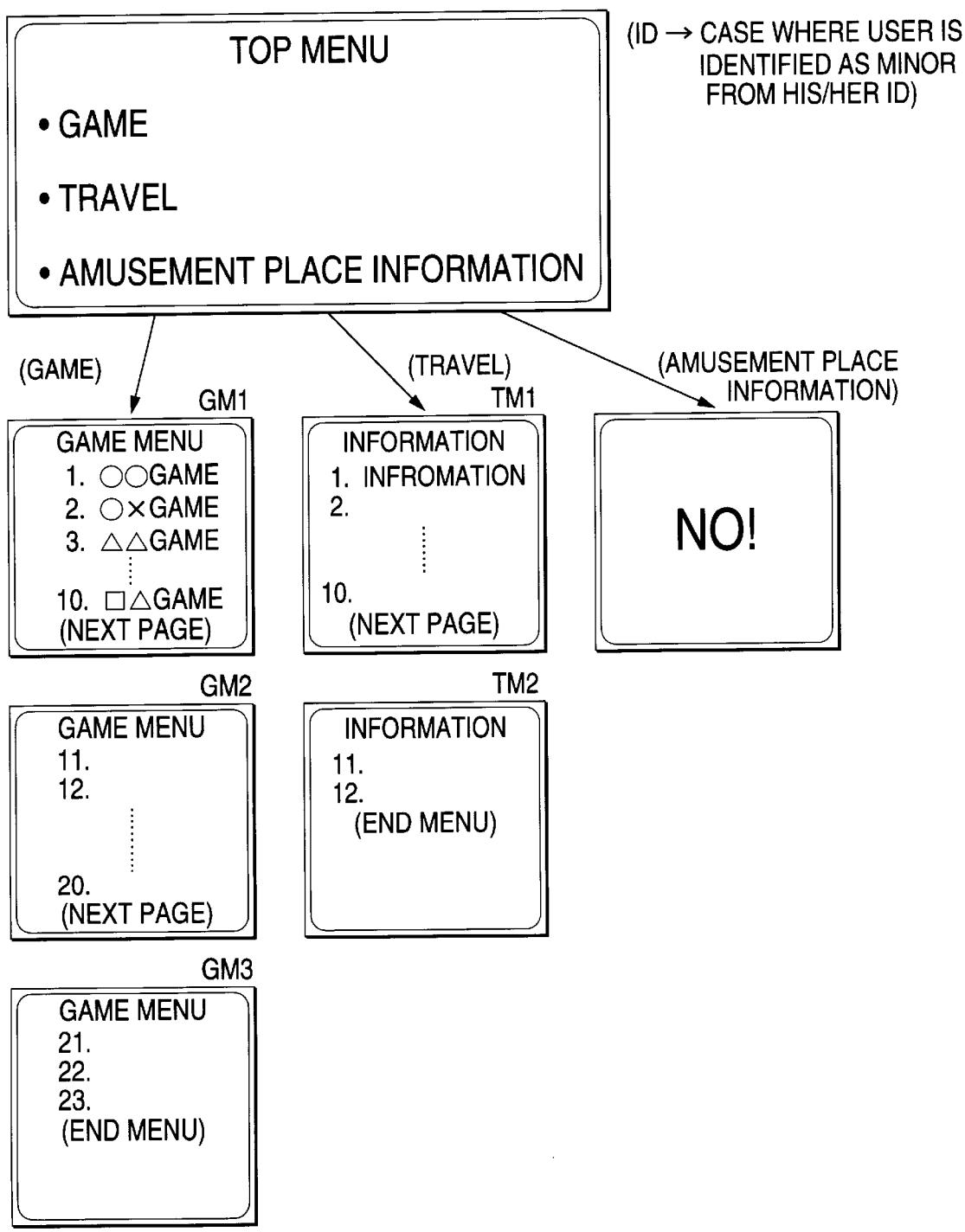
FIG. 18 shows one example of a top menu.

If the user enters a music number which corresponds to the information service menu using the remote control unit RMC, an object corresponding to that music number is read from the hard disk 24, and the thus-read object is executed. Consequently, a predetermined top menu is displayed. FIG. 18 shows one example of the top menu. In this example, "game", "travel", and "amusement place information" are displayed as menu options.

If a button of any one of the menu options is selected, the CPU 22 retrieves an information file corresponding to a selected genre from the hard disk 24. A title written in the header of the information file in the form of a string is displayed as a menu option.

Given that a button of the menu option "Game" is selected, a game menu GM1 shown in FIG. 18 appears on the screen. In this event, a sript for displaying the strings of the headers of the information files classified in the genre of game is written in the object of the game menu.

If the next page is selected by pressing the down key DWK (see FIG. 3), a game menu GM2 is displayed. If the next page is further selected, a game menu GM3 appears on the screen. In short, the game menus GM1 to GM3 are displayed as game menus, and a total of 23 titles are displayed on the screen. The title of each game is described in the string of the header of the information file of that game. As described above, many titles are displayed with regard to the game. In the object for defining each menu screen, the title of each menu is not fixed. The script is described in the object so as to display the title of the string of the selected information file. The CPU 22 controls a displaying operation according to the script, whereby a menu shown in FIG. 18 is automatically generated.

If the user selects a button for "Travel" from among the top menus, information files in the genre of travel are selected from the information files stored in the hard disk 24. In consideration of the user identification, only the information files for the youth other than the information files falling within the genre for adults are selected. The strings stored in the headers of the information files are displayed on the screen. In the illustrated example, twelve titles are selected, and they are divided into menu screens TM1 and TM2.

If the user selects a button for "Amusement Place Information", no information files will be selected, because the information files related to the amusement place information are classified as ones for adults. In such a situation, a sign, e.g., "NO", appears on the screen in order to inform the user that the current service may not be selected, as shown in FIG. 18. Such an operation is implemented by describing a script in the object to be started as a result of the selection of the "Amusement Place Information" button in such a way that a predetermined message is displayed when the user is identified as a youth by the ID information.

Although the genre is selected so as to avoid the genre for adults in the above-described embodiment, only the genre for adults or the genre for child and lady's use is also selectable.

If the ID card is not used, the menu will be prepared by use of all the information files delivered to the karaoke terminal 2. Even in this case, the information files delivered to the karaoke terminal are different, as required. Therefore, the menu is automatically generated in the same manner as in the previously described embodiment.

The information files may be classified into the genres according to music numbers without individually providing the information files with genre data. For example, the genres may be determined such that games are provided with numbers on the order of one thousand, and that information is provided with numbers of two thousands.

Buttons (i.e., the strings of each genre) of the top menu may be changed depending on the ID information. In short, the menu may be controlled in such a way that menu options having high frequency of selection are arranged in higher ranking. In this case, it is only necessary to write such a description as to change the layout of object buttons in the top menu depending on the ID information.

In the event that the genre of a certain menu option has not been generated yet, that menu option may be omitted from the top menu. For example, if information files that fall within the genre of travel have not been delivered to the karaoke terminal yet, it is possible to omit a menu option for travel from the top menu.

Among the information files, only the information files related to locations (such as a state, county, city, etc.) are previously extracted or delivered to the karaoke terminal. A menu may be automatically generated for the thus-selected information files in the manner as previously described, which makes it possible to offer the user attentive information services corresponding to districts.

(3) Examples of Information Services

Examples of information services will be described.

[1] Advertisement of Hit Songs and Karaoke-Performance

In this service, the ranking of the 20 latest hit songs is displayed in a scrolled manner. In the case where the user wants to sing one of them, the request for that song will be accepted.

Figure 19:
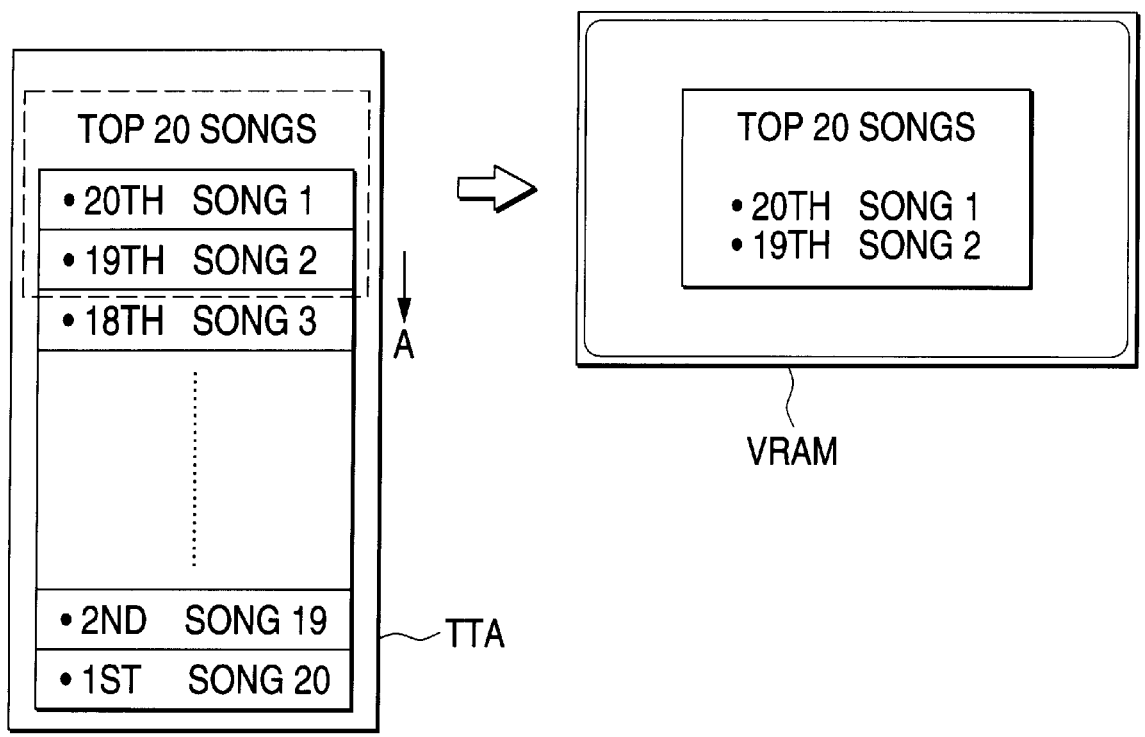
FIG. 19 is a diagrammatic representation of a virtual space TTA set in RAM 25.

A virtual space TTA shown in FIG. 19 is a memory space set in the RAM 25. Music numbers (not shown) and titles of top 20 songs are expanded in this space in decreasing order from the 20th to the 1st. The music numbers and titles are expanded in the memory space in the form of a bit map. The CPU 22 processes an object that represents a list of top 20 songs and is described by the scripts, whereby a list of the music numbers and titles is generated.

A broken line shown in FIG. 19 designates an area to be displayed (DPA). The area DPA shifts in the direction designated by arrow A shown in the drawing. The dot data related to the area DPA are transferred to VRAM in the image synthesizer 34, whereby the dot data are displayed on a display 35. In short, the list of top 20 songs is displayed on the display 35 in a scrolled manner.

A scrolling speed, the starting position of the scrolling operation, time, and the end position of the scrolling operation are written in the object used for displaying the top 20 songs. An operation carried out at the end of the scrolling operation is also written in the object. The CPU 22 determines the initial position and traveling speed of the area DPA (see the area surrounded by the broken line) shown in FIG. 19. By virtue of the above-described operations, it becomes possible for the user to know the titles of the top 20 songs from the scroll list.

The initiation of a karaoke performance during the course of the above-described information service (on the scroll display of the top 20 songs) will now be described.

The user memorizes the number of a song indicated in the scrolling list and enters that music number using the remote control unit RMC, whereby the song is selected.

Alternatively, the button of a song indicated in the scrolling list may be pressed to select the song. The button is selected in the same manner as is the case of the screen shown in FIG. 4.

Figure 20:
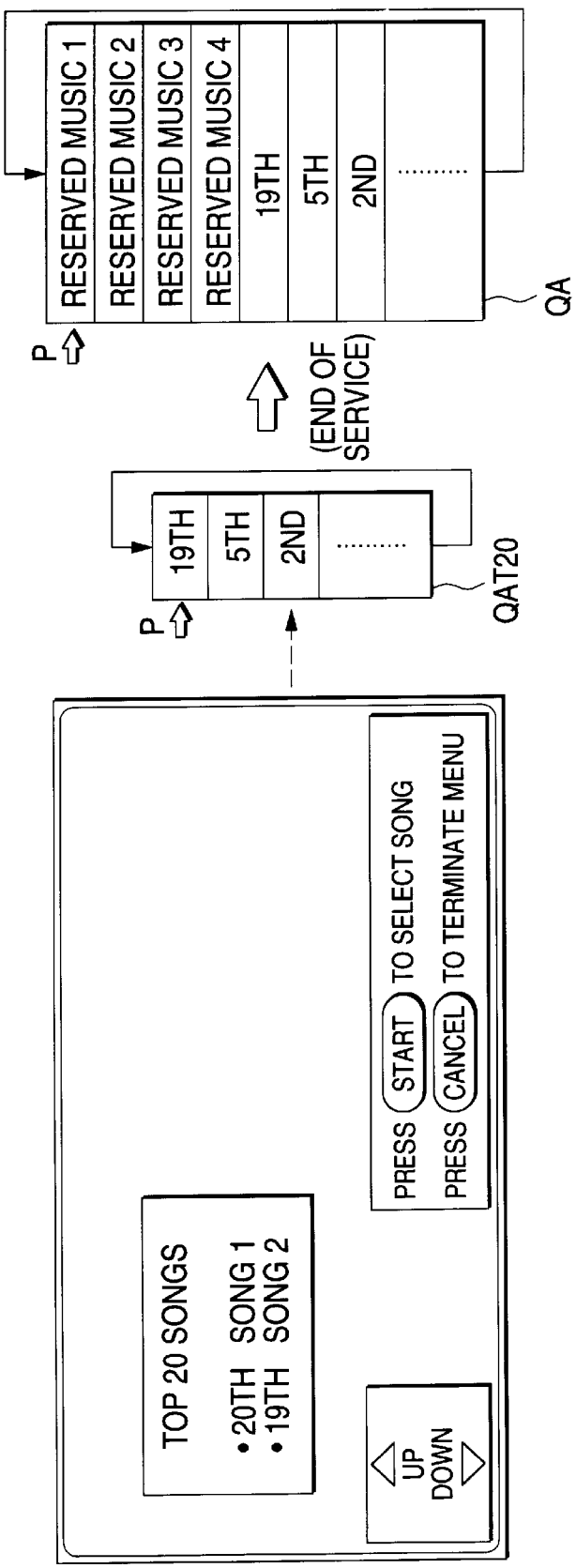
FIG. 20 is a diagrammatic representation of one example of a display screen that appears at the end of the scrolling of the menu.

It is possible to manually move the pointer up or down every line in such a scrolled manner at the end of the scrolling operation by pressing the up key UPK or down key DWK, as shown in FIG. 20. In this case, it is only necessary to select a button of desired music while that music is displayed by manual scrolling operations.

If the songs are selected as a result of the above-described operations, queues of the songs are sequentially registered in a predetermined location QAT 20 within the RAM 25 (see FIG. 20). Songs are reserved in the area QAT 20 shown in FIG. 20 in order of 19th, 5th, and 2nd music. If the next music is reserved, a queue of that music will be registered in the address next to the 2nd music. The area QAT 20 has a ring buffer structure. A queue is registered in the top address if the preceding queue has been registered in the end address. The pointer P shown in the drawing points at the music to be played next.

The performance of the music is started by pressing a predetermined key. If all of the songs of the reserved queues are finished, the list of top 20 songs will appear again. Further, even in the case where the cancel key CLK is pressed after the initiation of the performance of the music, the list of top 20 songs will appear again.

The above-described management of queues is carried out as a part of the processing associated with the service for displaying the list of top 20 songs. In contrast, the queues registered in the area QAT 20 may be transferred to a queue registration area QA used in a normal karaoke mode after the information service has finished. In this case, the cancel key CLK is first pressed in accordance with guidance information of the screen display shown in FIG. 20. In consequence, after the information service has finished, the karaoke terminal shifts to a karaoke mode. At this time, the queues registered in the area QAT 20 are transferred to the queue registration area QA.

If the queues of the reserved songs have already been registered in the queue registration area QA before the initiation of the list display service, the queues transferred from the area QAT 20 are registered in the address next to the addresses of these reserved songs. FIG. 20 shows the case where the queues of the 19th, 5th, and 2nd songs are transferred from the area QAT 20 when four songs have already been registered as reserved songs.

[2] Display of Motion Pictures

Figure 21:
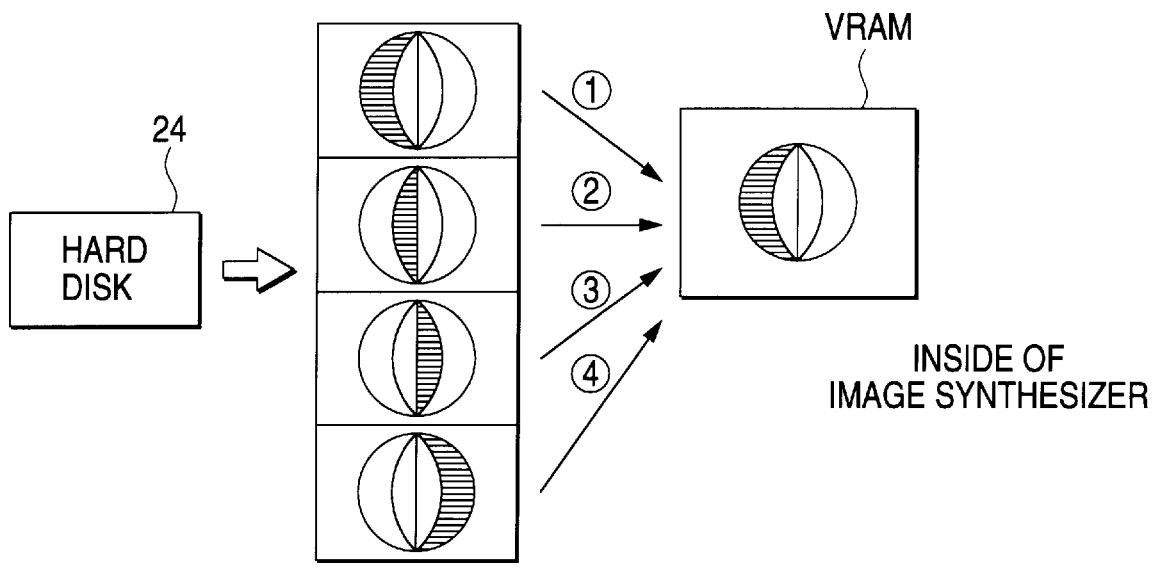
FIG. 21 is an explanatory view for illustrating the general control of display of motion pictures.
Figure 22:
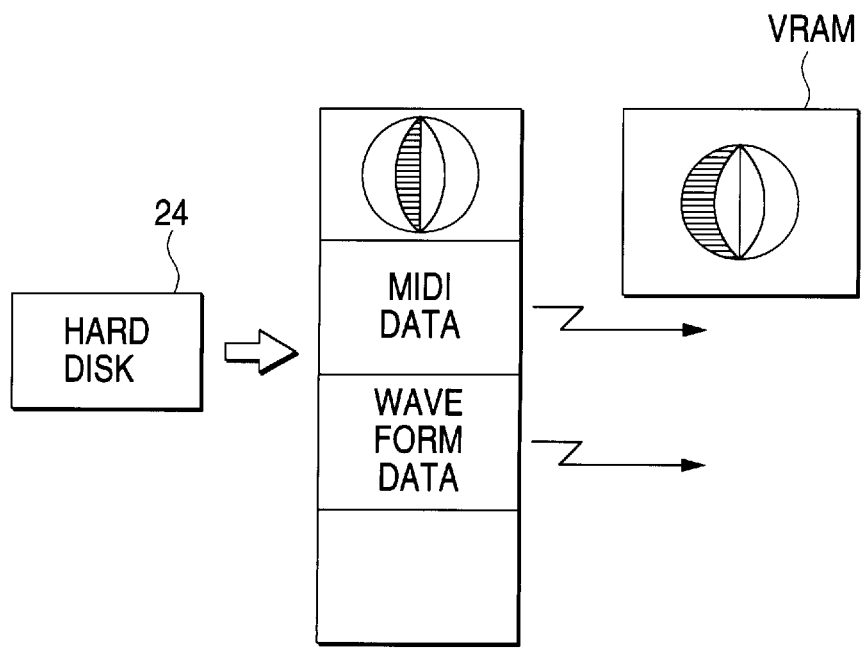
FIG. 22 is an explanatory view for illustrating the control of the display of motion pictures in the embodiment.

Depending on the type of information service, display of motion pictures may be effective for the user. For this reason, a variety of motion pictures are displayed in the present embodiment. Taking the display of a rotating ball as an example of the motion pictures, general control of a motion picture display will be described. In this event, a plurality of image data items showing the modes of the rotating ball are prepared, and these image data items are serially transmitted to the VRAM, so that motion pictures are displayed. For example, as shown in FIG. 21, image data (four image data items in the present embodiment) that show the modes of the rotating ball are transmitted from the hard disk 24 to predetermined locations of the RAM 25. The image data items are sequentially transmitted to the VRAM in a switchable manner. Consequently, the ball is displayed on the screen as if it is rotating (in a counterclockwise direction in the drawing). In this case, each image data item may be directly written into the VRAM from the hard disk 24. It takes much more time to transmit data from the hard disk than from semiconductor memory, so that it takes time to rewrite the VRAM. Hence, the state in which the motion pictures are rewritten is visible to the user, which renders the display of motion pictures inept.

If motion pictures are displayed after all the image data forming the motion pictures have been transferred to the RAM 25, as shown in FIG. 21, the motion pictures will be displayed smoothly. However, the large memory locations of the RAM 25 would be occupied by the image data, which makes the use of memory inefficient. To prevent this problem, the following processing is carried out in the present embodiment.

First, first image data item is transferred to a predetermined memory location of the RAM 25. Next, that first image data item is further transferred to the VRAM. While the first image data item is on display, a second image data item is overwritten on the same memory location of the RAM 25. The second image data item is transferred to the VRAM at predetermined timing (e.g., at timing equivalent to a vertical blanking period). Similar processing is carried out for third and fourth image data items. After the fourth image data item has been transferred to the VRAM, the first image data item is again transferred to the RAM 25. The rotating ball is displayed as a result of the repetition of the above-described operations. Only the memory location of the RAM 25 that corresponds to one image data items is used. Further, the image data item is written from the VRAM to the RAM 25 at high speed. In consequence, the efficiency of the use of the memory is improved, and the motion pictures are displayed smoothly.

As described above, the efficiency of the use of the memory of the present embodiment is high. For this reason, unassigned memory locations can be used for another application. So long as MIDI data or waveform data, for example, have previously been transferred from the hard disk 24 to the VRAM, music can be automatically played or generated by use of the data, as required. Because of a high access speed, the timing at which a sound is produced can be controlled with high accuracy. In contrast, if the MIDI data or waveform data are read from the hard disk, the timing at which a sound is produced will be slightly roughly controlled because of a low access speed. The reading of sound data is switched between the RAM 25 and the hard disk 24 depending on applications.

For instance, if "SE=XX . . . " is written in the object, the sound data will be read from the RAM 25 (the sound data have previously been loaded in the RAM 25 in this case). On the other hand, if "Sound=OOO . . . " is written in the object, the sound data will be directly read from the hard disk 24. In this case, "SE" is used for producing sound data that need synchronization.

[3] Accounting

Figure 23:
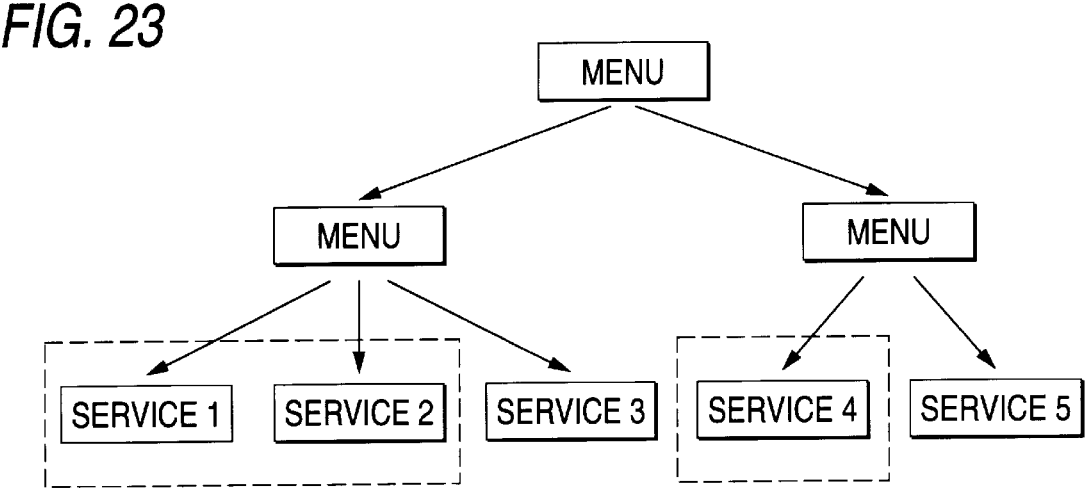
FIG. 23 is a tree diagram of one example of a hierarchical menu of the embodiment.

Next, accounting operations for the case of pay services will be described. The following descriptions of the accounting are based on the assumption that service 1, service 2 and service 4 of such hierarchical menus and services as shown in FIG. 23 which are surrounded with a broken line are pay services. Whether or not the service is a pay service is determined by describing a pay service in the script (object) of the information service which needs accounting.

An accounting check operation carried out by the CPU 22 will be described. For the above-described case, the CPU 22 initially carries out an accounting check operation, for example, according to a flowchart shown in FIG. 24. Whether or not the current information service is a pay service is determined in step SP1. This determination is made on the basis of the description of the object. If the result of the determination is NO, the accounting check operation will not be executed. In contrast, if the result of the determination made in step SP1 is YES, whether or not a valid card (e.g., a credit card) is used is determined in step SP2. The determination is made on the basis of the detected signal sent from the card terminal 70 shown in FIG. 20. If a valid card is used, the processing escapes from the accounting operations shown in FIG. 24 in order to settle a charge using the card. On the other hand, if an invalid card is used, whether or not a cash payment is sufficient will be determined in step SP3.

In other words, it is determined whether or not the amount of coins and bills inserted into the cash inserting unit 50 is more than a charge of the service to be executed from now. If the amount of inserted cash is sufficient, the service will be immediately executed. Then, the processing escapes from the accounting check operations. In contrast, if the amount of inserted cash is insufficient, a shortage message appears on the screen in step SP4, and the processing proceeds to step SP5. FIG. 25 shows an exemplary display of the shortage in step SP4. Specifically, an information display reading "Shortage of - - - yen" appears, which lets the user know that there is a shortage of the inserted cash. If the user inserts cash corresponding to the shortage into the cash inserting unit 50, a detection signal is output from the cash inserting unit 50. The CPU 22 receives this detection signal and outputs a result "YES" in step SP5. Then, the accounting service is executed (step SP6). In contrast, if the user presses the cancel key CLK in response to the information display shown in FIG. 25, or if no cash is inserted into the cash inserting unit within a given period of time, NO will be output as a determination result in step SP5. Then, the current processing escapes from the pay service, and the processing returns to the display of an upper menu (step SP7). Instead of returning to the display of an upper menu display, the processing may return to the karaoke mode.

For example, newly released music inquiry service may be mentioned as one example of the pay service. For example, the previously-described display as shown in FIG. 16 appears on the display, and newly released songs are introduced one another by vertically scrolling the text information that consists of titles of music, names of artists, and music numbers. The title of a guidance screen and image information, such as a picture or a photograph, are displayed in fixed positions on the screen together with the newly released song information in addition to the icon IC5 for use in pressing the start key STK.

Figure 24:
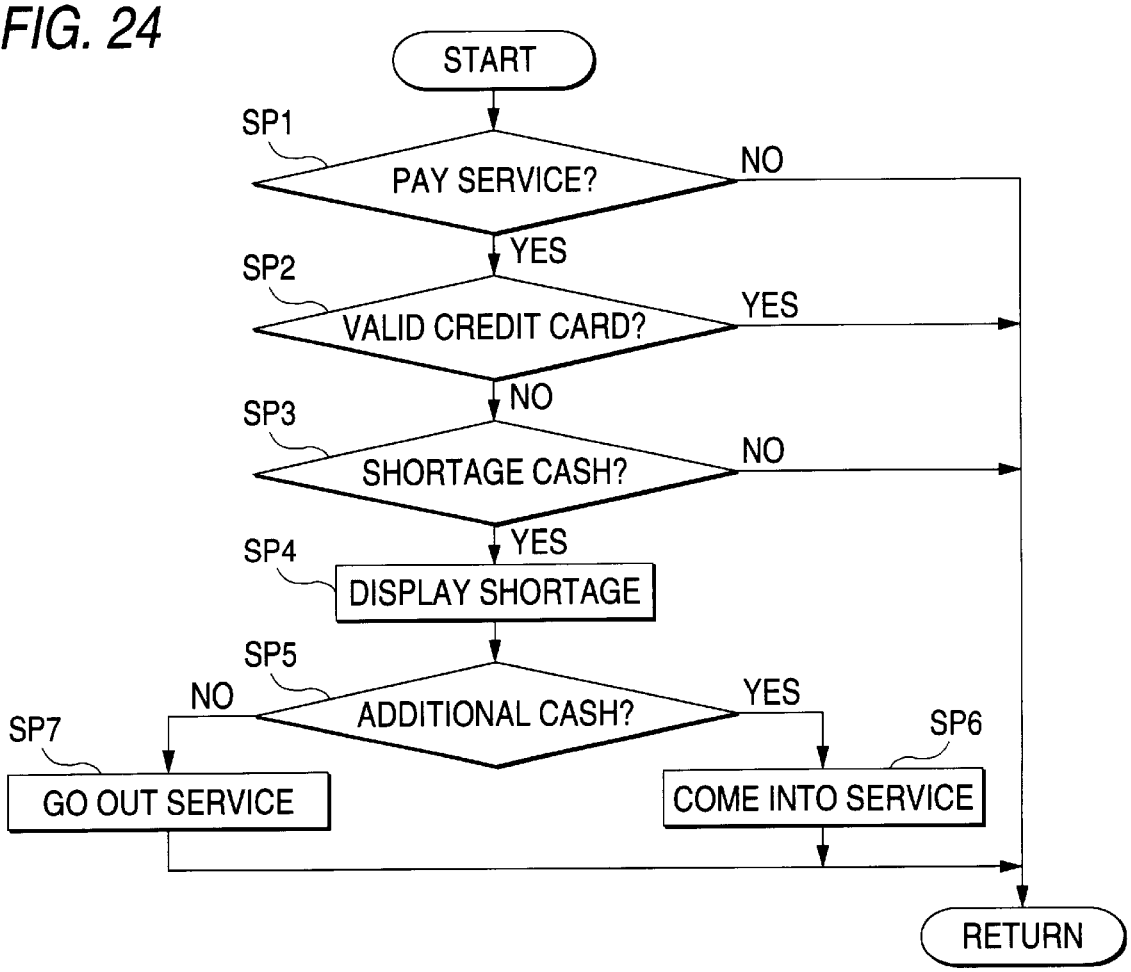
FIG. 24 is a flowchart which shows an accounting check operation.

If an operator presses the start key STK, an information file displayed on the left side of the icon is executed. Then, karaoke music or compact disk music (the performance of music together with lyrics by playing back a compact disk) of that song is started. In this case, the corresponding compact disk has already been set in the CD changer 60 by a serviceman. The accounting check processing shown in FIG. 24 is started when the start key STK is pressed. If the amount of inserted money is insufficient, the new music is not played.

If a predetermined period of time has elapsed after karaoke music of a newly released song has been started, the operation of the cancel key CLK is invalidated. Control information for invalidating key operations is written in the object. For example, the control information is written into the object so as to invalidate a predetermined key signal if given conditions are satisfied. To invalidate the key, the control information may be written in the Delay box of the object. For example, the control information may be described such that a predetermined key is invalidated after a lapse of five seconds since the service screen has been displayed. Another example of such control is the case where a service of pay information is forcefully executed by invalidating the cancel key if the user continuously watches that pay information for a certain period of time.

The pay service may find the following applications. For example, orders for drinks and meals in a karaoke bar (in the compartment-style karaoke bar) are accepted in the form of an entry of music numbers, and the acceptance of the order is dealt with as the pay service. In this case, the user can settle up a bill by inserting the money for the bill into the cash inserting unit as well as being able to order meals etc. by the remote control unit.

In some compartment-style karaoke bars, hire of a compartment is charged by the hour. In this case, the karaoke terminal is provided with a timer for counting the leased time. The CPU 22 is arranged so as to receive a time signal from the timer (i.e., an interrupt signal). As a result, the CPU 22 can grasp a total time for which the user has leased the compartment. If the leased time corresponding to the amount of money inserted by the user ends, the accounting check processing shown in FIG. 24 will be started so as to give the user notice of the shortage of the money. In this case, the automatic settlement of the hire charge becomes possible.

[4] Log

FIG. 26 shows the tree structure of the menus and information services. As illustrated in the drawing, where there are menus and information services 1 to 8, it is possible to conveniently grasp the use of menus and information services by logging which of menus or information services is accessed (or how many times the menus and information services are accessed).

To this end, the karaoke terminal of the present embodiment is provided with a flag register FL, as shown in FIG. 26. A flag 1 is set in a bit corresponding to the accessed menu or information service. The bits of the flag register FL correspond to predetermined menus and information services. Accordingly, the details of the flag register FL make it possible to grasp the use of the menus and information services.

It is possible to grasp which of menus or information services is accessed if it is determined which of objects has been executed. A predetermined bit of the flag register FL is written when the CPU 22 executes an object.

Figure 27:
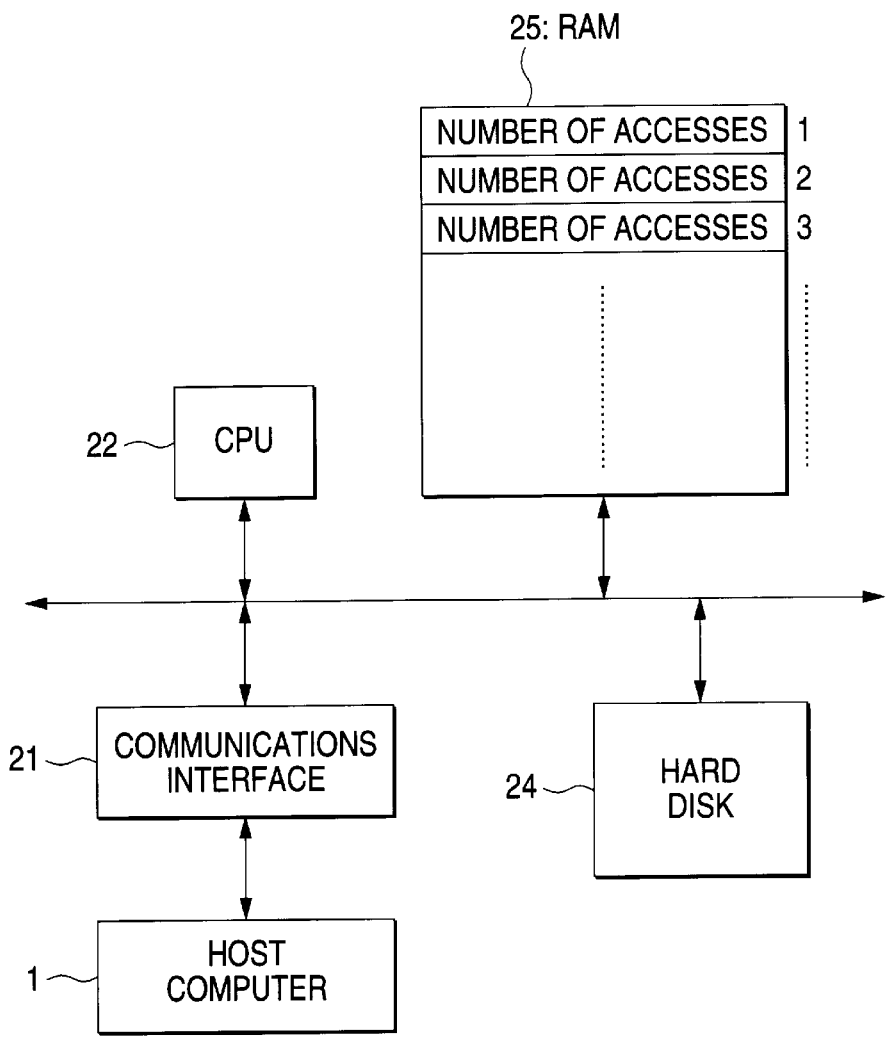
FIG. 27 is a block diagram which shows one example of the configuration of the communication karaoke system when the number of accesses is logged with respect to each information service.

If the number of accesses of each menu or information service is logged, it will be desirably possible to grasp the use of the menu or service information more accurately. FIG. 27 shows one example of the configuration of the communication karaoke system that carries out the above-described control operations. As shown in the drawing, the number of accesses of each menu or information service is logged in each address of a predetermined memory location within the RAM 25. In short, the CPU 22 recognizes which of menus or information services is executed when executing the object. Then, the number of times the corresponding address is accessed is incremented.

If the above-described operations are carried out, it becomes possible to grasp the use of each menu or service information in a very detailed manner by observing a predetermined memory location of the RAM 25. It is also possible to read the information related to the number of accesses stored in the RAM 25 at predetermined time intervals or each time the host computer 1 issues a request. The thus-read information may be transferred to the host computer 1 via the communications interface 21. In this event, it is possible for the host computer 1 to carry out market research in order to know, e.g., what kind of information service is popular, and the result of the market research can be utilized to produce new information services.

The CPU 22 can switch the order of menu options in the menu depending on the number of accesses of the menu options (e.g., menu options having a large number of accesses are arranged in higher ranking). In this case, the descriptions of a predetermined object are partially changed depending on the number of accesses, and the order in which the menu options are displayed is also changed.

[5] LED Display

The control of an LED display provided in the front panel of the main body of the karaoke terminal will be described. In many cases, a common karaoke terminal is provided with an LED display. This LED display is usually used only for displaying the number of reserved music.

The LED display of the present embodiment is used not only for merely displaying the number of reserved music but also for effecting a variety of indications. Specifically, the control information of the LED display 55 is written in each object so that the LED display 55 carries out indications suitable for the characteristics of the menu or information service.

Figure 28:
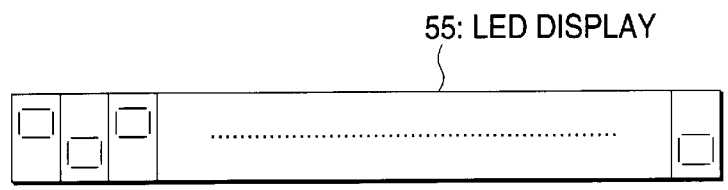
FIGS. 28A and 28B are diagrammatic representations of examples of display of an LED display 55.
Figure 28:
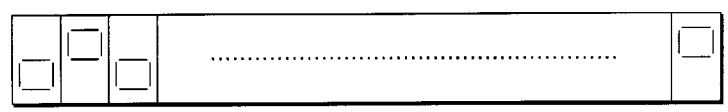

For example, if "LED=..." is described in the object, the CPU 22 will control the LED display 55 according to the details of the script. FIG. 28A shows 7-segment LEDs which illuminate figures in two rows in a staggered configuration, whereas FIG. 28B shows 7-segment LEDs which illuminate the figures in a reversed manner. So long as the 7-segment LEDs is displayed alternately in the manners as shown in FIGS. 28A and 28B. As a result, illumination effects can be obtained as if lights actively move.

The control information of an LED display unit 55 is individually described for each object, the LED indications having a wide variety can be effected depending on menus and information services. In this case, the control of the LED display unit as well as the control of only the display 35 can be written in the object. Therefore, there is no need to separately prepare a special program for LED control purposes.

C: Others

[1] Although the previously described embodiment is based on the application of the present invention to the communication karaoke system, the present invention can be applied to a general computer system as a matter of course. For example, where there are many object files to be executed in a common computer system, lists will be automatically generated according to genre by virtue of the automatic menu generating operations, which affords convenience to an operator.

As described above, by virtue of the computer system and the karaoke system, menus can be automatically generated according to genre on the basis of variations in information services to be offered. Further, by virtue of the karaoke system of the present invention, a karaoke performance can be carried out while the information service is offered to the user.

As previously described, by virtue of the present invention, a menu can be automatically generated according to the individual status of the user.

As described above, by virtue of the present invention, it is possible to grasp the use of information services, whereby customers needs and market trends can be obtained. Particularly, by virtue of the computer system and the karaoke system of the present invention, the sequence of menus of information services changes depending on the use of information services, which makes it possible to maintain the ease of use.

As described above, by virtue of the present invention, accounting operations can be carried out appropriately even when pay information services are offered. Specifically, a karaoke system is capable of automatically carrying out a settling operation with respect to various accounting operations.

As described above, where a variety of information services such as commercial messages are offered, data to be used (e.g., image, musical sound, or sound source data) can be shared among files which provide service. Further, the utilization of data can also be managed easily.

As described above, by virtue of the present invention, it is possible to quickly access a desired service with simple operations. Further, by virtue of the present invention, it is possible to easily accept a karaoke request while an information service is offered.

What is claimed is:

1. A computer system comprising:

storage means for storing a plurality of object files, each object file containing at least one instruction executable by the computer system and information on a genre of each object file; and processing means for automatically selecting an object file from the storage means and executing the at least one instruction in the selected object file, wherein said selected at least one instruction constituted a variety of advertisements, games, or information.

2. The computer system as defined in claim 1, further comprising:

retrieval means for retrieving object files classified in a specified genre;

list generating means for generating a list including titles that correspond to the object files retrieved by the retrieval means; and display means for displaying the list generated by the list generating means.

3. The computer system as defined in claim 2, wherein each object file has title information for use in displaying a title that suits the contents of that object file, and the list generating means generates the list on the basis of the title information contained in the object file retrieved by the retrieval means.

4. The computer system as defined in claim 1, further comprising:

genre determination means for determining the specified genre in response to a user's operations.

5. The computer system as defined in any one of claims 1 through 4, wherein the computer system implements a karaoke system, the karaoke system including:

karaoke playing means which synthesizes a musical sound by reading the karaoke music information from the storage means and produces an output by mixing the synthesized musical sound with a voice input through a microphone; and switching means for switching between the execution of the object file and the performance of karaoke music carried out by the karaoke playing means.

6. The computer system as defined in claim 5, wherein the performance of karaoke music carried out by the karaoke playing means is described in the at least one instruction of the object file as a selectable instruction.

7. The computer system as defined in claim 1, further comprising:

ID information reading means for reading ID information that includes personal information of a user;

genre determination means for determining an individual genre corresponding to the personal information read by the ID information reading means;

retrieval means for retrieving object files which fall within both a specified genre and the individual genre determined by the genre determination means;

list generating means for generating a list including titles that correspond to the object files retrieved by the retrieval means; and display means for displaying the list generated by the list generating means.

8. The computer system as defined in claim 7, wherein each object file has title information for use in displaying a title that suits the contents of that object file, and the list generating means generates the list on the basis of the title information contained in the object file retrieved by the retrieval means.

9. The computer system as defined in claim 7, further comprising genre determination means for determining the specified genre in response to a user's operations.

10. The computer system as defined in any one of claims 7 through 9, wherein the computer system implements a karaoke system, the karaoke system including:
   karaoke playing means which synthesizes a musical sound by reading the karaoke music information from the storage means and produces an output by mixing the synthesized musical sound with a voice input through a microphone; and
   switching means for switching between the execution of the object file and the performance of karaoke music carried out by the karaoke playing means.

11. The computer system as defined in claim 10, wherein the performance of karaoke music carried out by the karaoke playing means is described in the program of the object file as a selectable instruction.

12. The computer system as defined in claim 10, wherein the ID information is stored in an ID card, and the ID information reading means is made up of an ID card reader.

13. A computer system as claimed in claim 1 further comprising:
   determination means for determining whether or not each object file has been executed; and
   execution status storage means for storing a determination result, which is made by the determination means, for each objet file.

14. A computer system as claimed in claim 13, further comprising:
   storage means for storing how many times each object has been executed, on the basis of a determination result of the determination means.

15. The computer system as defined in claim 14, further comprising:
   menu generation means for generating a menu for the object which changes the sequence of display of menus on the basis of the number of times each object is executed that is stored in the number-of-times storage means.

16. The computer system as defined in any one of claims 13 through 15, wherein the computer system implements a karaoke system, the karaoke system including:
   karaoke playing means which synthesizes a musical sound by reading the karaoke music information from the storage means and produces an output by mixing the synthesized musical sound with a voice input through a microphone; and
   switching means for switching between the execution of the object file and the performance of karaoke music carried out by the karaoke playing means.

17. The computer system as claimed in claim 1, further comprising:
   karaoke playing means which synthesizes a musical sound by reading the karaoke music information from the storage means and produces an output by mixing the synthesized musical sound with a voice input through a microphone;
   switching means for switching between the execution of the object file and the performance of karaoke music carried out by the karaoke playing means;
   cash inserting device that outputs information about the amount of money inserted by a user;
   determination means for determining whether or not the object file is executed or whether or not the karaoke playing means performs karaoke music by comparing the amount of money inserted by the user with a charge for the execution of the object file or the performance of karaoke music, if the execution of the object file or the performance of karaoke music carried out by the karaoke is a pay service; and
   accounting means that permits the execution of the object file or the performance of karaoke music if the determination means has determined that the execution of the object file or the performance of karaoke music is allowable, and that displays a message so as to encourage the user to insert money as well as rendering the termination of the execution of the object file or performance of karaoke music selectable if the determination means has determined that the execution of the object file or the performance of karaoke music is not allowable,
   wherein the determination means again determines whether or not the object file is executed or whether or note the karaoke playing means performs karaoke music, in consideration of newly received money information if the money information is output from the cash inserting device after the accounting means has encouraged the user to insert money.

18. The computer system as defined in claim 17, further comprising:
   operation means for providing instructions regarding various processing operations in accordance with the user's operations; and
   operation invalidating means that invalidates specific operations, which are performed by operation means, under predetermined conditions after the accounting means has permitted the execution of the object file or the performance of karaoke music.

19. The computer system as defined in claim 1, wherein data referred to by the program of the object file are individually stored in the storage means as a resource file, and an arbitrary resource can be specified by the at least one instruction of each object file.

20. The computer system as defined in claim 19, further comprising:
   information file receiving means that receives an information file consisting of the object file and the resource file, and that individually stores into the storage mean the object file and the resource file contained in the received information file.

21. A computer system that employs the computer system as defined in any one of claims 7 through 9 comprising:
   karaoke playing means which synthesizes a musical sound by reading the karaoke music information from the storage means and produces an output by mixing the synthesized musical sound with a voice input through a microphone; and
   switching means for switching between the execution of the object file and the performance of karaoke music carried out by the karaoke playing means.

22. The computer system as defined in claim 21, wherein the performance of karaoke music carried out by the karaoke playing means is described in the at least one instruction of the object file as a selectable instruction.

23. The computer system as defined in claim 1, further comprising:
   karaoke playing means for synthesizing a musical sound by reading the karaoke music information from the storage means and producing an output by mixing the synthesized musical sound with a voice input through a microphone;

switching means for switching between the execution of the object file and the performance of karaoke music carried out by the karaoke playing means;

an object file for use in display a menu that is stored in the storage means, and that includes a program for displaying a title list matching up with predetermined object files and a program for encouraging the execution of an object file when it is selected from the title list; and object file execution instructing means for providing an instruction for execution of the menu display object file when a predetermined operation is carried out by a user.

24. The computer system as defined in claim 23, wherein the karaoke playing means produces a request queue which represents each requested sound each time karaoke music is requested, and synthesizes a musical sound by sequentially reading the karaoke music information in accordance with the order of the request queues, and wherein the object file execution instructing means produces an instruction for executing the menu display object file after the performance of the karaoke music corresponding to the last request queue has finished if the request queue is prepared when the predetermined operations are performed.

25. The computer system as defined in claim 23, wherein the karaoke playing means produces a request queue which represents each requested sound each time karaoke music is requested, and synthesizes a musical sound by sequentially reading the karaoke music information in accordance with the order of the request queues, and wherein the object file execution instructing means produces an instruction for executing the menu display object file immediately after the karaoke music currently being played has finished if the request queue is prepared when the predetermined operations are performed.

26. The computer system as defined in claim 24 or 25, wherein the performance of karaoke music carried out by the karaoke playing means is described in the program of the object file as a selectable instruction.

27. The computer system as defined in claim 26, wherein if the performance of music carried out by the karaoke playing means is specified by the program of the object file, the performance of the music requested during the course of execution of an object file is prioritized in an interrupted manner, irrespective of a request queue which has already been generated when the performance is specified.

28. The computer system as defined in claim 26, wherein if the performance of music carried out by the karaoke playing means is specified by the program of the object file, a second request queue is added so as to follow the request queue that has already been generated at the time of the initiation of the object file after the second request queue has been generated with respect to the music requested during the execution of the object file as well as the execution of the object file having finished.

* * * * *

UNITED STATES PATENT AND TRADEMARK OFFICE
CERTIFICATE OF CORRECTION

PATENT NO. : 6,231,347 B1
DATED : May 15, 2001
INVENTOR(S) : Kenneth S. Wrye and David W. Crowe It is certified that error appears in the above-identified patent and that said Letters Patent is hereby corrected as shown below:

Title page,
Item [54], replace "RECIRCULATING-X-RAY" with
-- RECIRCULATING X-RAY --.

Column 2,
Line 1, replace "systems" with -- systems --.

Column 7,
Line 25, replace "will exit the either" with -- will exit either --.

Signed and Sealed this

Twelfth Day of March, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.     : 6,231,347 B1
DATED          : May 15, 2001
INVENTOR(S)    : Tom Jen Tsai It is certified that error appears in the above-identified patent and that said Letters Patent is hereby corrected as shown below:

This certificate supersedes Certificate of Correction issued March 12, 2002. The certificate was issued in error and should be vacated.

Signed and Sealed this

Seventh Day of January, 2003

JAMES E. ROGAN
*Director of the United States Patent and Trademark Office*